(12) United States Patent
Crivellari et al.

(10) Patent No.: US 12,508,865 B2
(45) Date of Patent: Dec. 30, 2025

(54) MULTI-MODE THERMAL CONTROL SYSTEM FOR A VEHICLE

(71) Applicant: MASERATI S.P.A., Modena (IT)

(72) Inventors: Attilio Crivellari, Volvera (IT); Andrea Flamini, Modena (IT); Antonio Iannace, Modena (IT); Giorgio Pusceddu, Monte San Pietro (IT); Gianluca Silvestrini, Modena (IT); Luigi Smeraglia, Zola Predosa (IT)

(73) Assignee: Maserati S.P.A., Modena (IT)

( * ) Notice: Subject to any disclaimer, the term of this patent is extended or adjusted under 35 U.S.C. 154(b) by 110 days.

(21) Appl. No.: 18/555,084

(22) PCT Filed: Jun. 15, 2022

(86) PCT No.: PCT/IB2022/055529
§ 371 (c)(1),
(2) Date: Oct. 12, 2023

(87) PCT Pub. No.: WO2022/264050
PCT Pub. Date: Dec. 22, 2022

(65) Prior Publication Data
US 2024/0208291 A1    Jun. 27, 2024

(30) Foreign Application Priority Data
Jun. 16, 2021    (IT) .......................... 102021000015764

(51) Int. Cl.
*B60H 1/00*    (2006.01)
*B60H 1/32*    (2006.01)

(52) U.S. Cl.
CPC ..... *B60H 1/00278* (2013.01); *B60H 1/00392* (2013.01); *B60H 1/00885* (2013.01);
(Continued)

(58) Field of Classification Search
CPC ............ B60H 1/00278; B60H 1/00392; B60H 1/00885; B60H 1/32281; B60H 1/323; B60H 2001/00307; Y02T 10/07
See application file for complete search history.

(56) References Cited

U.S. PATENT DOCUMENTS 7,789,176 B2 *  9/2010  Zhou .................. B60H 1/00885
                                              180/65.1
8,336,319 B2 * 12/2012  Johnston ................ B60K 11/04
                                              62/434

(Continued)

FOREIGN PATENT DOCUMENTS

CN         112356637 A        2/2021
DE         19833251 A1 *      1/1999 ......... B60H 1/00007

(Continued)

OTHER PUBLICATIONS

International Search Report for International Patent Application No. PCT/IB2022/055529, mailed Sep. 19, 2022.

*Primary Examiner* — Ljiljana V. Ciric
(74) *Attorney, Agent, or Firm* — Armstrong Teasdale LLP

(57) ABSTRACT

A thermal control system for a vehicle has a battery thermal control loop having a refrigerant-fluid heat exchanger, a powertrain thermal control loop, a refrigerant loop having a compressor, a condenser, an evaporator, a first valve coupling the evaporator to the refrigerant loop and a second valve coupling the refrigerant-fluid heat exchanger to the refrigerant loop, and a first valve assembly. When the first valve assembly is in a first mode, the battery thermal control loop and the powertrain thermal control loop are not in fluidic connection. When the first valve assembly is in a second mode, the battery thermal control loop and the powertrain thermal control loop are coupled together in partial bleed-off. A cabin thermal control loop with a liquid-air heat exchanger provides temperature control of a cabin of
(Continued)

the vehicle. First, second, third, fourth, fifth and sixth connecting branches connect the battery, powertrain and cabin thermal control loops.

12 Claims, 14 Drawing Sheets

(52) U.S. Cl.
CPC ......... *B60H 1/32281* (2019.05); *B60H 1/323* (2013.01); *B60H 2001/00307* (2013.01); *Y02T 10/70* (2013.01)

(56) References Cited

U.S. PATENT DOCUMENTS

| | | | | |
|---|---|---|---|---|
| 8,402,776 B2* | 3/2013 | Johnston | B60L 50/40 | 62/79 |
| 8,448,696 B2* | 5/2013 | Johnston | B60L 58/27 | 165/917 |
| 8,997,503 B2* | 4/2015 | Morisita | B60H 1/039 | 62/243 |
| 9,016,080 B2* | 4/2015 | Brodie | F28D 20/028 | 62/239 |
| 9,511,645 B2* | 12/2016 | Johnston | B60H 1/32284 | |
| 9,533,544 B2* | 1/2017 | Johnston | B60H 1/00278 | |
| 9,731,576 B2* | 8/2017 | Johnston | B60H 1/00921 | |
| 9,758,011 B2* | 9/2017 | Johnston | B60H 1/32284 | |
| 9,758,012 B2* | 9/2017 | Johnston | B60H 1/00921 | |
| 9,764,620 B2* | 9/2017 | Liu | B60H 1/3213 | |
| 9,844,995 B2* | 12/2017 | Rawlinson | B60H 1/32281 | |
| 10,573,940 B2* | 2/2020 | Dunham | H01M 10/617 | |
| 10,967,702 B2* | 4/2021 | Mancini | B60H 1/00564 | |
| 10,994,587 B2* | 5/2021 | Zenner | B60H 1/143 | |
| 11,059,351 B2* | 7/2021 | Zenner | B60H 1/00385 | |
| 11,338,647 B1* | 5/2022 | Johnston | B60H 1/32011 | |
| 11,407,273 B2* | 8/2022 | Kim | B60H 1/3204 | |
| 11,407,280 B1* | 8/2022 | Turudic | B60L 3/0023 | |
| 11,458,812 B2* | 10/2022 | Jeong | B60H 1/00907 | |
| 11,560,041 B1* | 1/2023 | Johnston | B60H 1/00885 | |
| 11,752,836 B1* | 9/2023 | Johnston | B60H 1/32011 | 62/239 |
| 11,858,309 B2* | 1/2024 | Song | B60H 1/00278 | |
| 11,919,360 B2* | 3/2024 | Takagi | B60H 1/32284 | |
| 11,987,097 B1* | 5/2024 | Johnston | B60H 1/00328 | |
| 12,017,510 B2* | 6/2024 | Kim | B60H 1/143 | |
| 12,115,839 B2* | 10/2024 | Kim | B60H 1/00271 | |
| 2008/0295535 A1* | 12/2008 | Robinet | H01M 10/663 | 62/259.2 |
| 2013/0074525 A1* | 3/2013 | Johnston | B60H 1/323 | 62/126 |
| 2013/0298583 A1* | 11/2013 | O'Donnell | B60H 1/323 | 62/115 |
| 2014/0216709 A1* | 8/2014 | Smith | B60H 1/00278 | 165/41 |
| 2016/0107501 A1* | 4/2016 | Johnston | B60H 1/00278 | 165/41 |
| 2016/0107502 A1* | 4/2016 | Johnston | B60H 1/00921 | 165/202 |
| 2016/0107503 A1* | 4/2016 | Johnston | B60H 1/00278 | 165/202 |
| 2016/0107505 A1* | 4/2016 | Johnston | B60H 1/00278 | 165/202 |
| 2016/0107506 A1* | 4/2016 | Johnston | B60H 1/00278 | 165/202 |
| 2016/0107508 A1* | 4/2016 | Johnston | B60H 1/00278 | 237/12.3 A |
| 2016/0153343 A1* | 6/2016 | Kakehashi | B60K 11/02 | 123/41.31 |
| 2016/0318409 A1* | 11/2016 | Rawlinson | B60L 1/003 | |
| 2016/0332505 A1* | 11/2016 | Yamanaka | B60H 1/143 | |
| 2019/0118610 A1* | 4/2019 | Johnston | B60H 1/143 | |
| 2019/0351740 A1* | 11/2019 | Filipkowski | B60H 1/32284 | |
| 2020/0101814 A1* | 4/2020 | Takagi | B60H 1/00914 | |
| 2021/0061067 A1 | 3/2021 | Kim et al. | | |
| 2023/0020687 A1* | 1/2023 | Kim | H01M 10/613 | |
| 2023/0034110 A1* | 2/2023 | Huang | B60L 58/26 | |
| 2023/0415612 A1* | 12/2023 | Dunn | B60K 11/02 | |
| 2024/0186545 A1* | 6/2024 | Dunn | H01M 8/04738 | |
| 2024/0208291 A1* | 6/2024 | Crivellari | B60H 1/32281 | |

FOREIGN PATENT DOCUMENTS

FR 3081123 A1 11/2019
WO 2019166709 A1 9/2019

* cited by examiner

MULTI-MODE THERMAL CONTROL SYSTEM FOR A VEHICLE

CROSS-REFERENCE TO RELATED APPLICATIONS

This application is a National Phase Application of PCT International Application No. PCT/IB2022/055529, having an International Filing Date of Jun. 15, 2022, which claims priority to Italian Application No. 102021000015764 filed Jun. 16, 2021, each of which is hereby incorporated by reference in its entirety.

FIELD OF THE INVENTION

The present invention relates to a multi-mode thermal control system for the thermal control of an (at least partially) electrically powered vehicle, or of a vehicle having a powertrain with an electric motor and a supply system with a battery pack adapted to power the electric motor, and related thermal control methods that make use of such a multi-mode thermal control system.

BACKGROUND OF THE INVENTION

Multi-mode thermal control systems for the thermal control of a vehicle are known in the prior art of the field.

For example, U.S. Pat. No. 9,758,011 B2 shows a thermal control system for an electrically powered vehicle, comprising a battery thermal control loop thermally coupled to a battery pack of the vehicle, a powertrain thermal control loop thermally coupled to an electric motor of the vehicle, and a cabin thermal control loop thermally coupled to the cabin of the vehicle. Due to the connection method between the three different loops, the methods of use of the thermal control systems are very limited in the prior art.

SUMMARY OF THE INVENTION

The object of the present invention is to provide a multi-mode thermal control system for a vehicle having an electric motor and a battery pack which powers it which does not suffer from the drawbacks of the prior art, and which may therefore be used in a plurality of different modes of use depending on the heating or cooling requirements of the different vehicle components.

This and other objects are fully achieved according to the present invention by virtue of a thermal control system as described and claimed herein.

Advantageous embodiments of the thermal control system according to the present invention are also described.

In summary, the invention is based on the idea of providing a multi-mode thermal control system for a vehicle having a powertrain with an electric motor and a supply system with a battery pack adapted to power said electric motor, the thermal control system comprising:
a battery thermal control loop, comprising a first circulation pump and a refrigerant-fluid heat exchanger, wherein said first circulation pump is adapted to circulate heat transfer fluid within said battery thermal control loop, and wherein said battery thermal control loop is thermally coupled to said battery pack of the vehicle;
a powertrain thermal control loop comprising a second circulation pump, wherein said second circulation pump is adapted to circulate heat transfer fluid within said powertrain thermal control loop, wherein said powertrain thermal control loop is thermally coupled to said electric motor of the vehicle;
a first connecting branch adapted to allow the passage of heat transfer fluid from the powertrain thermal control loop to the battery thermal control loop;
a second connecting branch, adapted to allow the passage of heat transfer fluid from the battery thermal control loop to the powertrain thermal control loop;
a refrigerant loop wherein a refrigerant is circulated, and comprising a compressor, a condenser, an evaporator, a first thermal expansion valve adapted to couple said evaporator to said refrigerant loop, and a second thermal expansion valve adapted to couple said refrigerant-fluid heat exchanger to said refrigerant loop;
a first valve assembly, said first valve assembly comprising a three-way valve, and being adapted to control the fluidic connection between the battery thermal control loop and the powertrain thermal control loop by adjusting the passage of heat transfer fluid in the first connecting branch or in the second connecting branch, and being configurable for this purpose in a first mode and in a second mode,
wherein, when the first valve assembly is configured in the first mode, the battery thermal control loop and the powertrain thermal control loop operate in parallel with, and independent of, each other, i.e. are not in fluidic connection with each other, i.e. the heat transfer fluid circulating within the battery thermal control loop does not also circulate in the powertrain thermal control loop, and
when the first valve assembly is configured in the second mode, the battery thermal control loop and the powertrain thermal control loop are coupled in partial bleed-off configuration in which only a portion of the flow rate of heat transfer fluid circulating within said powertrain thermal control loop also circulates in the battery thermal control loop;
a cabin thermal control loop, which comprises a third circulation pump and a liquid-air heat exchanger, wherein said third circulation pump is adapted to circulate heat transfer fluid within said cabin thermal control loop and through said liquid-air heat exchanger, and wherein said cabin thermal control loop provides temperature control of a vehicle passenger cabin;
a third connecting branch, adapted to allow the passage of heat transfer fluid from the battery thermal control loop to the cabin thermal control loop;
a fourth connecting branch adapted to allow the passage of heat transfer fluid from the cabin thermal control loop to the battery thermal control loop;
a fifth connecting branch, adapted to allow the passage of heat transfer fluid from the cabin thermal control loop to the powertrain thermal control loop; and
a sixth connecting branch adapted to allow the passage of heat transfer fluid from the powertrain thermal control loop to the cabin thermal control loop.

Within the scope of the present invention, in this description and in the appended claims, when it is said that two thermal control loops "operate parallel with, and independent of, each other," it means that they operate in such a way that the heat transfer fluid circulating in one loop does not also circulate in the other loop, i.e. in such a way that there is no sharing of flow rate of heat transfer fluid between the two loops. On the contrary, when it is said that two thermal control loops "operate in series," it means that they operate in such a way that the entire flow rate of heat transfer fluid circulating within one of said loops also circulates in the other of said loops, unless of course there are undesired leaks. Finally, when it is said that two thermal control loops are coupled "in a partial bleed-off configuration," it means that the two loops are connected in such a way that only part of the flow of heat transfer fluid circulating within one loop also circulates in the other.

By virtue of a configuration of the thermal control system as in the invention, it is possible to achieve the objects of the invention, and, in particular, it is possible to provide a plurality of operating modes including cooling and/or heating of different vehicle components, including the electric motor, the battery pack, and the cabin of the vehicle.

Preferably, the first valve assembly consists of a three-way valve.

Advantageously, the thermal control system may also comprise a second valve assembly, adapted to control the fluidic connection between the battery thermal control loop and the cabin thermal control loop by adjusting the passage of heat transfer fluid in the third connecting branch or in the fourth connecting branch, and configurable, for this purpose, in a first mode and in a second mode, wherein when the second valve assembly is configured in the first mode, the battery thermal control loop and the cabin thermal control loop operate in parallel with, and independent of, each other, i.e. they are not in fluidic connection with each other, i.e. the heat transfer fluid circulating within the battery thermal control loop does not also circulate within the cabin thermal control loop, and when the second valve assembly is configured in the second mode, the battery thermal control loop and the cabin thermal control loop are coupled together in a series configuration in which the entire flow rate of heat transfer fluid circulating within said battery thermal control loop also circulates in the cabin thermal control loop. Even more advantageously, in this embodiment, the thermal control system may further comprise a third valve assembly, adapted to control the fluidic connection between the powertrain thermal control loop and the cabin thermal control loop by adjusting the passage of heat transfer fluid in the fifth connecting branch or in the sixth connecting branch, and configurable, for this purpose, in a first mode and in a second mode, in which, when the third valve assembly is configured in the first mode, the cabin thermal control loop and the powertrain thermal control loop operate in parallel with, and independent of, each other, i.e. they are not in fluidic connection with each other, i.e. the heat transfer fluid circulating within the powertrain thermal control loop does not also circulate within the cabin thermal control loop, and, when the third valve assembly is configured in the second mode, the cabin thermal control loop and the powertrain thermal control loop are coupled together in a series configuration in which the entire flow rate of heat transfer fluid circulating within said cabin thermal control loop also circulates within the powertrain thermal control loop. Even more advantageously, the cabin thermal control loop may further comprise an electric heating device adapted to provide heat to the heat transfer fluid circulating within the cabin thermal control loop when turned on.

Preferably, the powertrain thermal control loop comprises a radiator, which is thermally coupled to said condenser of the refrigerant loop. In this embodiment, advantageously, the powertrain thermal control loop may further comprise a bypass valve configurable in a first mode and in a second mode, wherein when the bypass valve is configured in the first mode, it allows the heat transfer fluid circulating within said powertrain thermal control loop to flow through said radiator, and wherein when the bypass valve is configured in the second mode, it allows the heat transfer fluid circulating within said powertrain thermal control loop to bypass said radiator.

Furthermore, a further aspect of the invention relates to control methods for controlling the thermal control system of the invention, as described below and, in particular, as recited in the claims.

BRIEF DESCRIPTION OF THE DRAWINGS

Further features and advantages of the present invention will appear more clearly from the following detailed description, given by way of non-limiting example, with reference to the accompanying drawings, in which.

DETAILED DESCRIPTION

Figure 1:
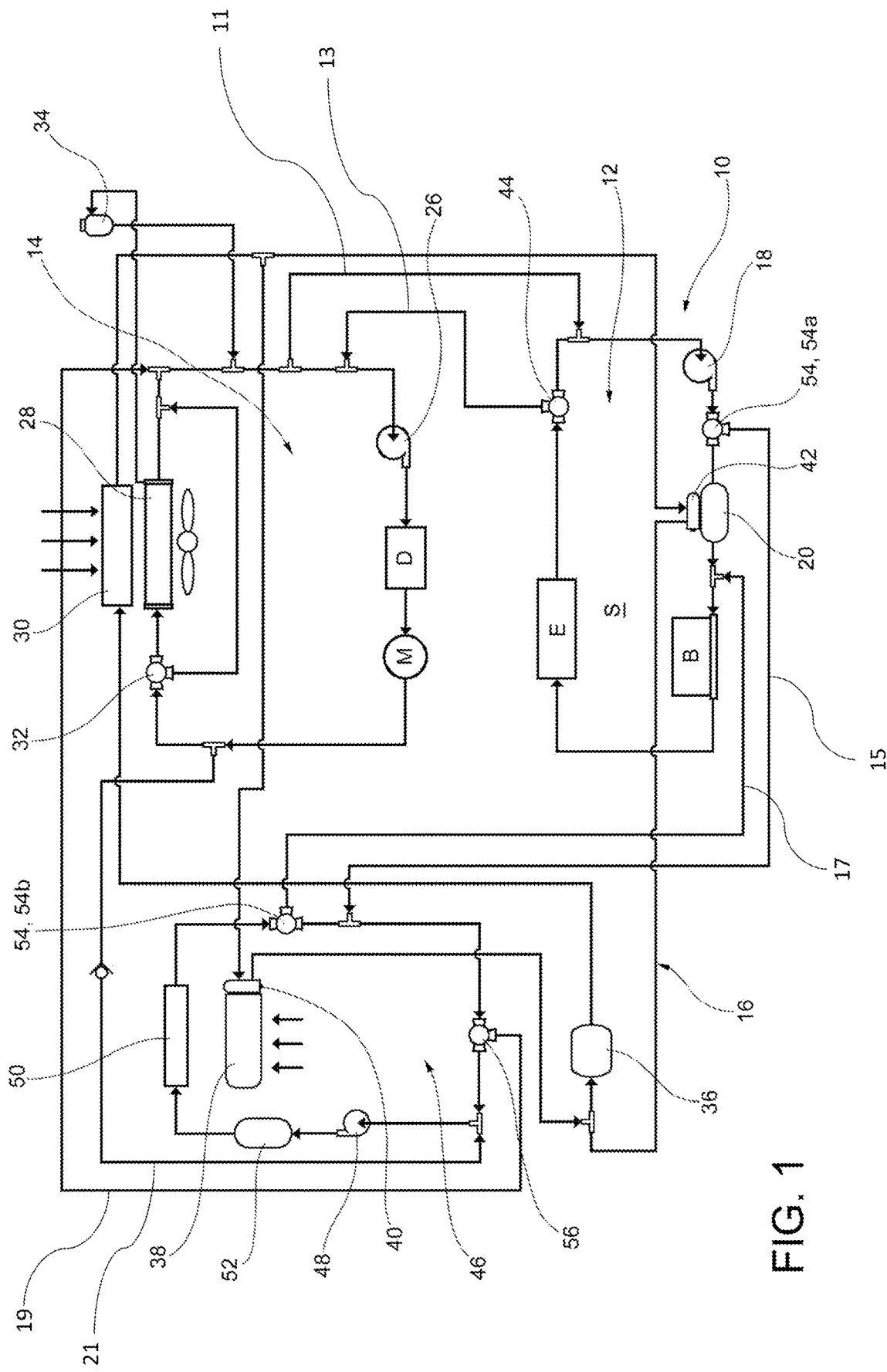
FIG. 1 is a schematic view of the thermal control system according to an embodiment of the invention.

With reference to the figures, the thermal control system according to the invention is generally indicated with reference numeral 10. The thermal control system 10 is a multi-mode system, i.e. it is a system which may be configured in a plurality of different modes of use, depending on the type of use required (cooling, heating, or neither) with respect to a plurality of components (electric motor, batteries, cabin, and others) which are thermally coupled to the system and which require thermal control.

The thermal control system 10 is used for the thermal control of a vehicle, in particular of a vehicle having a powertrain D, with an electric motor M, and a supply system S, with a battery pack B, adapted to power said electric motor M. Preferably, the vehicle is a fully electrically powered vehicle. As is apparent, the powertrain D may also comprise a greater number of electric motors M, and the battery pack B may comprise one or more batteries or cells adapted to power said one or more electric motors M, but the description and the appended claims always refer to a single electric motor M and a single battery pack B only for simplicity and brevity and in a purely illustrative and non-limiting manner.

The thermal control system 10 comprises a battery thermal control loop 12, a powertrain thermal control loop 14, and a cabin thermal control loop 46, wherein a heat transfer fluid is circulated, and a refrigerant loop 16, wherein a refrigerant is circulated. The thermal control system 10 also comprises a first, a second, a third, a fourth, a fifth and a sixth connecting branch 11, 13, 15, 17, 19 and 21 which are arranged in such a way as to allow the fluidic connection between the battery thermal control loop 12, the powertrain thermal control loop 14 and the cabin thermal control loop 46 as described in greater detail below.

The heat transfer fluid may consist of a mixture of water and glycol, in variable proportions depending on the application. The refrigerant may, by way of non-limiting example, include the refrigerant R-1234y (according to the denominative standard of the American Society of Heating, Refrigerating and Air-Conditioning Engineers), or also other types of refrigerant (such as anhydride carbon dioxide, R-290 refrigerant fluid and/or R-134a refrigerant fluid according to the same standard just mentioned). According to a preferable embodiment of the invention, the heat transfer fluid and the refrigerant are different from each other, and according to an even more preferred embodiment of the invention, the heat transfer fluid consists of a mixture of water and glycol, while the refrigerant comprises R-1234y refrigerant and/or R-290 refrigerant and/or R-134a refrigerant according to the aforementioned standard.

Figure 13:
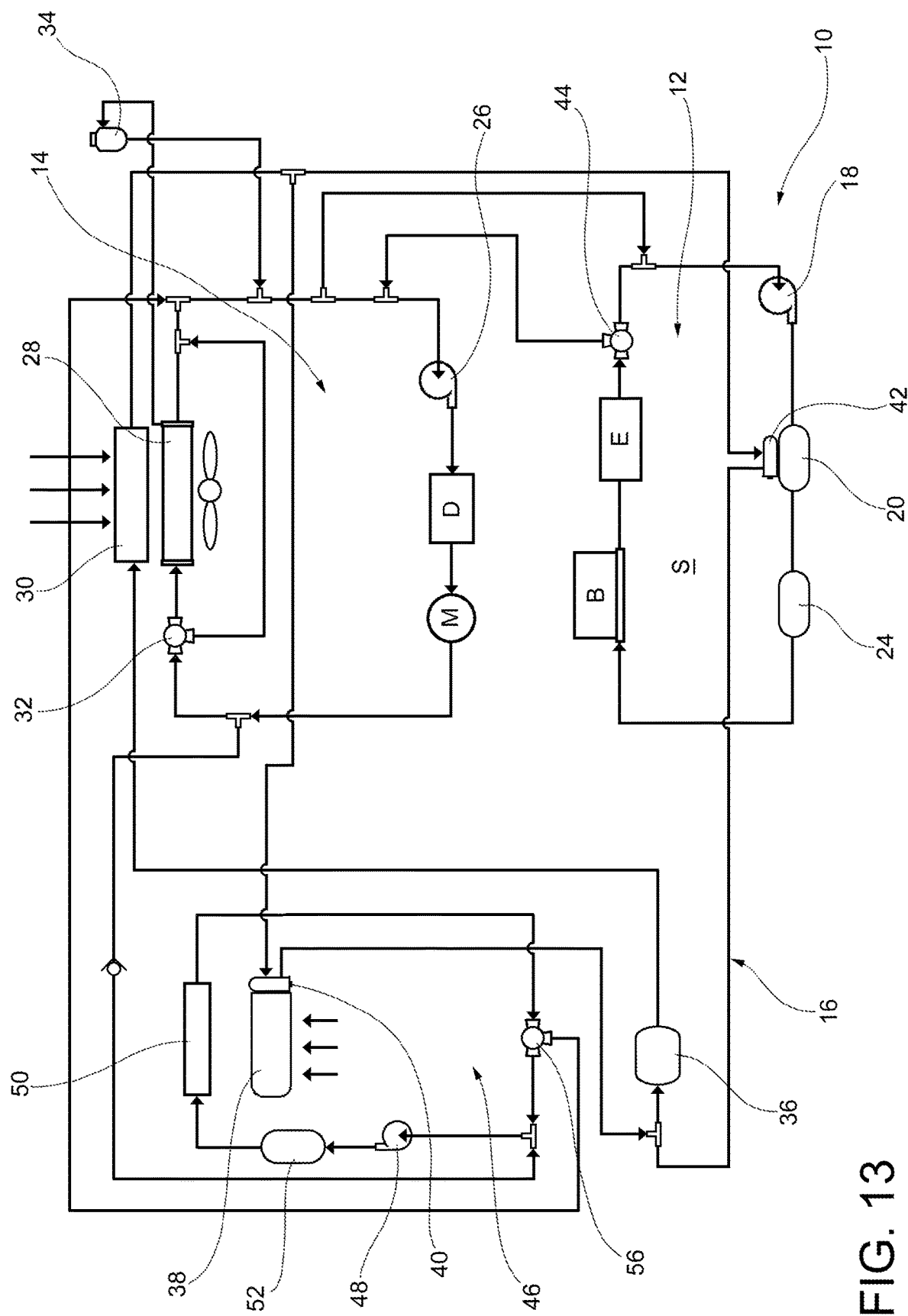
FIG. 13 is a schematic view of the thermal control system according to a further embodiment of the invention.
Figure 14:
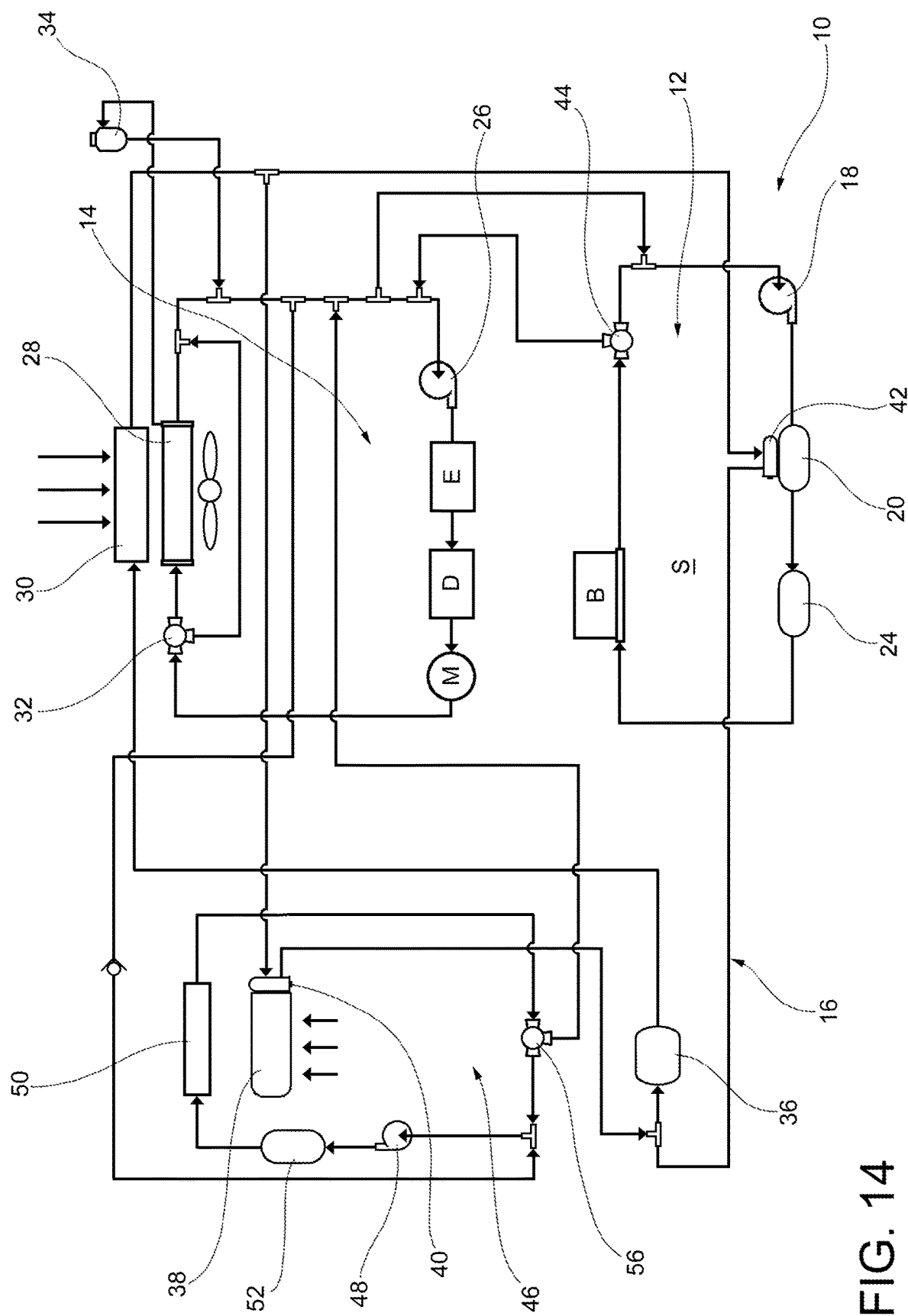
FIG. 14 is a schematic view of the thermal control system according to a further embodiment of the invention.

The battery thermal control loop 12 is thermally coupled to the battery pack B of the vehicle, i.e. the arrangement and relative configuration of the battery pack B and of the battery thermal control loop 12 are such as to allow the exchange of thermal energy between the battery thermal control loop 12 and the battery pack B in both directions, to allow controlled heating or cooling of the battery pack B. In some embodiments of the invention, such as those shown in FIG. 1 and FIG. 13, the battery thermal control loop 12 is also thermally coupled to an electronic system E of the vehicle, i.e. the arrangement and relative configuration of the electronic system E and of the battery thermal control loop 12 are such as to allow the transfer of thermal energy between the battery thermal control loop 12 and the electronic system E in both directions, to allow controlled heating or cooling of the electronic system E.

The battery thermal control loop 12 comprises a first circulation pump 18 and a refrigerant-fluid heat exchanger 20. The first circulation pump 18 is adapted to circulate heat transfer fluid within the battery thermal control loop 12 in a manner known per se. The refrigerant-fluid heat exchanger 20 is adapted to allow the heat transfer between the battery thermal control loop 12 and the refrigerant loop 16. Advantageously, a thermal expansion valve the second thermal expansion valve 42, described below—is arranged in such a way as to control the flow of refrigerant in the refrigerant-fluid heat exchanger 20, and, therefore, the thermal coupling between the battery thermal control loop 12 and the refrigerant loop 16.

In preferable embodiments of the invention, such as for example those shown in FIGS. 11 to 14, the battery thermal control loop 12 may further comprise a battery electric heating device 24, adapted to supply heat to the heat transfer fluid circulating in the battery thermal control loop 12 when turned on.

The powertrain thermal control loop 14 is thermally coupled to the powertrain D, and in particular to the electric motor M of the vehicle, i.e. the arrangement and relative configuration of the electric motor M and of the powertrain thermal control loop 14 are such as to allow the transfer of thermal energy between the powertrain thermal control loop 14 and the electric motor M in both directions, to allow controlled heating or cooling of the electric motor M. In some embodiments of the invention, such as those shown in FIGS. 8 to 12 and in FIG. 14, the powertrain thermal control loop 14 is also thermally coupled to the electronic system E of the vehicle, i.e. the arrangement and relative configuration of the electronic system E and of the powertrain thermal control loop 14 are such as to allow the transfer of thermal energy between the powertrain thermal control loop 14 and the electronic system E in both directions, to allow controlled heating or cooling of the electronic system E. Of course, the powertrain thermal control loop 14 may also be thermally coupled to further components of the powertrain D which require thermal control, in a manner known per se.

The powertrain thermal control loop 14 further comprises a second circulation pump 26. The second circulation pump 26 is adapted to circulate heat transfer fluid within the powertrain thermal control loop 14 in a manner known per se. Advantageously, the powertrain thermal control loop 14 may further comprise a radiator 28, which is arranged so as to be thermally coupled to a condenser 30 of the refrigerant loop 16 (which will be described below). Preferably, in this case, said radiator 28 is arranged on a by-passable branch of the powertrain thermal control loop 14. In this case, the powertrain thermal control loop 14 comprises a bypass valve 32, configurable in a first mode and in a second mode. When such bypass valve 32 is configured in the first mode, this allows the passage of the heat transfer fluid circulating within the powertrain thermal control loop 14 in the radiator 28. Conversely, when the bypass valve 32 is configured in the second mode, this allows the heat transfer fluid circulating within the powertrain thermal control loop 14 to bypass said radiator 28, i.e. it diverts the flow of the heat transfer fluid circulating within the powertrain thermal control loop 14 on a branch which bypasses the radiator 28. In a manner known per se, such bypass valve 32 may be provided as a three-way valve, or as a selection valve which allows control of which of the two outlet branches to direct the inlet heat transfer fluid flow to. In a manner known per se, such radiator 28 may be associated with an expansion tank 34 into which the heat transfer fluid circulating within the powertrain thermal control loop 14 flows. In a manner known per se, a fan may be associated with the radiator 28.

The refrigerant loop 16 comprises, in addition to the aforementioned condenser 30 (exposed to an air flow represented in the figures with three small arrows), also a compressor 36, an evaporator 38 (exposed to an air flow represented in the figures with three small arrows), a first thermal expansion valve 40, and a second thermal expansion valve 42. The evaporator 38 is arranged so as to be thermally coupled to the cabin of the vehicle. The first thermal expansion valve 40 is adapted to couple the evaporator 38 to the refrigerant loop 16; the second thermal expansion valve 42, on the other hand, is adapted to couple the refrigerant-fluid heat exchanger 20 of the battery thermal control loop 12 to the refrigerant loop 16, so as to allow the heat transfer between the refrigerant and the heat transfer fluid circulating within the battery thermal control loop 12.

In one operating mode, when the compressor 36 is turned on, the refrigerant is compressed by it and, subsequently, passes inside the condenser 30. In a manner known per se, a first phase change occurs inside the condenser 30, whereby the refrigerant, due to the effect of the heat transfer with the air flow to which the condenser 30 is exposed, passes from the gaseous state to the liquid state. The refrigerant, now liquid, is then subcooled in this way, and is made available through the first thermal expansion valve 40 and the second thermal expansion valve 42, which adjust the flow of refrigerant to the evaporator 38 and to the refrigerant-fluid heat exchanger 20, respectively. At this point, the refrigerant, by passing through the evaporator 38 and the refrigerant-fluid heat exchanger 20, operates a second phase change, evaporating due to the heat exchanged with the external air, through the evaporator 38, and with the heat transfer fluid, in the refrigerant-fluid heat exchanger 20, respectively. The refrigerant leaving the evaporator 38 and the refrigerant-fluid heat exchanger 20 is finally returned back to the compressor 36, from where the cycle just described may start all over again.

For the fluid connection between the battery thermal control loop 12 and the powertrain thermal control loop 14, the thermal control system 10 also comprises—as anticipated—a first connecting branch 11, arranged so as to allow the passage of heat transfer fluid from the powertrain thermal control loop 14 to the battery thermal control loop 12, and a second connecting branch 13, arranged so as to allow the passage of heat transfer fluid from the battery thermal control loop 12 to the powertrain thermal control loop 14.

The thermal control system 10 according to the invention further comprises a first valve assembly 44, arranged so as to be able to control the fluidic connection between the battery thermal control loop 12 and the powertrain thermal control loop 14, i.e. so as to be able to control or adjust the passage of all or part of the flow rate of heat transfer fluid circulating within the first connecting branch 11 or the second connecting branch 13. For this purpose, the first valve assembly 44 is arranged at the first connecting branch 11, upstream of the battery B, or at the second connecting branch 13, downstream of the battery B. In fact, the first valve assembly 44 is configurable in a first mode and in a second mode, according to the type of functional relationship to be established between the battery thermal control loop 12 and the powertrain thermal control loop 14. When the first valve assembly 44 is configured in the first mode, the battery thermal control loop 12 and the powertrain thermal control loop 14 operate in parallel and independently of each other, i.e. the heat transfer fluid circulating within the powertrain thermal control loop 14 does not also circulate within the battery thermal control loop 12, i.e. there is no sharing of flow rate of heat transfer fluid between the battery thermal control loop 12 and the powertrain thermal control loop 14. On the other hand, when the first valve assembly 44 is configured in the second mode, the battery thermal control loop 12 and the powertrain thermal control loop 14 are coupled in partial bleed-off configuration, i.e. in a configuration in which only a portion of the flow rate of heat transfer fluid circulating within the powertrain thermal control loop 14 also circulates in the battery thermal control loop 12. According to the invention, such first valve assembly 44 comprises a three-way valve. More preferably, such first valve assembly 44 consists of a three-way valve. Finally, even more preferably, this first valve assembly 44 consists of a three-way valve and the connection, and the relative operating mode (i.e. the selection of the parallel or partial bleed-off operating mode) between the powertrain thermal control loop 14 and the battery thermal control loop 12 is controllable and adjustable only by means of said first valve assembly 44, and there are no further valves; in particular, there are no four-way valves for adjusting the connection and the relative operating mode between the powertrain thermal control loop 14 and the battery thermal control loop 12.

According to the invention, as anticipated, the thermal control system 10 further comprises a cabin thermal control loop 46. The cabin thermal control loop 46 provides temperature control of a cabin of the vehicle, i.e. it is thermally coupled to the cabin of the vehicle. The cabin thermal control loop 46 comprises a third circulation pump 48 and a liquid-air heat exchanger 50. The third circulation pump 48 is adapted to circulate heat transfer fluid within the cabin thermal control loop 46, and, therefore, also through the liquid-air heat exchanger 50 in a manner known per se. Advantageously, the cabin thermal control loop 46 further comprises an electric heating device 52 adapted to provide heat to the heat transfer fluid circulating within the cabin thermal control loop 46 when turned on.

For the fluid connection between the battery thermal control loop 12 and the cabin thermal control loop 46, as anticipated, the thermal control system 10 also comprises a third connecting branch 15, arranged so as to allow the passage of heat transfer fluid from the battery thermal control loop 12 to the cabin thermal control loop 46, and a fourth connecting branch 17, arranged so as to allow the passage of heat transfer fluid from the cabin thermal control loop 46 to the battery thermal control loop 12.

The adjustment of the coupling between the cabin thermal control loop 46 and the battery thermal control loop 12 may be carried out in various ways. For this purpose, in some embodiments shown in FIGS. 1 to 10, the thermal control system 10 further comprises a second valve assembly 54, arranged so as to be able to control the fluidic connection between the battery thermal control loop 12 and the cabin thermal control loop 46, i.e. so as to be able to control or adjust the passage of all or part of the flow rate of heat transfer fluid circulating within the third connecting branch 15 or the fourth connecting branch 17. In fact, the second valve assembly 54 may be configured in a first mode and in a second mode, according to the type of functional relationship to be established between the battery thermal control loop 12 and the cabin thermal control loop 46. When the second valve assembly 54 is configured in the first mode, the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. On the other hand, when the second valve assembly 54 is configured in the second mode, the battery thermal control loop 12 and the cabin thermal control loop 46 are coupled in a series configuration in which the entire flow rate of heat transfer fluid circulating within the battery thermal control loop 12 also circulates in the cabin thermal control loop 46. Preferably, such second valve assembly 54 comprises a first three-way valve 54a, arranged at the third connecting branch 15, downstream of the battery B, and a second three-way valve 54b, arranged at the fourth connecting branch 17, upstream of the battery B.

For the fluid connection between the powertrain thermal control loop 14 and the cabin thermal control loop 46, as anticipated, the thermal control system 10 also comprises a fifth connecting branch 19, arranged so as to allow the passage of heat transfer fluid from the cabin thermal control loop 46 to the powertrain thermal control loop 14, and a sixth connecting branch 21, arranged so as to allow the passage of heat transfer fluid from the powertrain thermal control loop 14 to the cabin thermal control loop 46.

The adjustment of the coupling between the cabin thermal control loop 46 and the powertrain thermal control loop 14 may be carried out in various ways. For this purpose, in some embodiments, such as those shown in FIGS. 1 to 14, the thermal control system 10 further comprises a third valve assembly 56, arranged so as to be able to control the fluidic connection between the powertrain thermal control loop 14 and the cabin thermal control loop 46, i.e. so as to be able to control or adjust the passage of all or part of the flow rate of heat transfer fluid circulating within the fifth connecting branch 19 or the sixth connecting branch 21. For this purpose, the third valve assembly 56 is arranged at the fifth connecting branch 19, downstream of the liquid-air heat exchanger 50, or at the sixth connecting branch 21, upstream of the liquid-air heat exchanger 50. In fact, the third valve assembly 56 may be configured in a first mode and in a second mode, according to the type of functional relationship to be established between the powertrain thermal control loop 14 and the cabin thermal control loop 46. When the third valve assembly 56 is configured in the first mode, the powertrain thermal control loop 14 and the cabin thermal control loop 46 operate in parallel and independently of each other, i.e. the heat transfer fluid circulating within the cabin thermal control loop 46 does not also circulate within the powertrain thermal control loop 14, i.e. there is no sharing of flow rate of heat transfer fluid between the powertrain thermal control loop 14 and the cabin thermal control loop 46. On the other hand, when the third valve assembly 56 is configured in the second mode, the powertrain thermal control loop 14 and the cabin thermal control loop 46 are coupled in a series configuration in which the entire flow rate of heat transfer fluid circulating within the powertrain thermal control loop 14 also circulates in the cabin thermal control loop 46. Preferably, such third valve assembly 56 comprises a first three-way valve 56a.

At least one of the first valve assembly 44, the second valve assembly 54 and the third valve assembly 56 may be made in such a way as to be able to obtain intermediate control conditions, through the use of proportional motorized three-way valves, which allow the split passage of the flow of heat transfer fluid or refrigerant.

The thermal control system 10 according to the invention may operate in different ways, i.e. it may be controlled according to different control methods, depending on the type of thermal control (heating, cooling, or neither of the two) that is required for the different components of the vehicle which are thermally coupled to the thermal control system 10 (cabin, battery pack B, powertrain D, etc.). Some of these control methods, or operating modes, will be described with reference to the thermal control system 10 according to the embodiment shown in FIG. 1.

Figure 2:
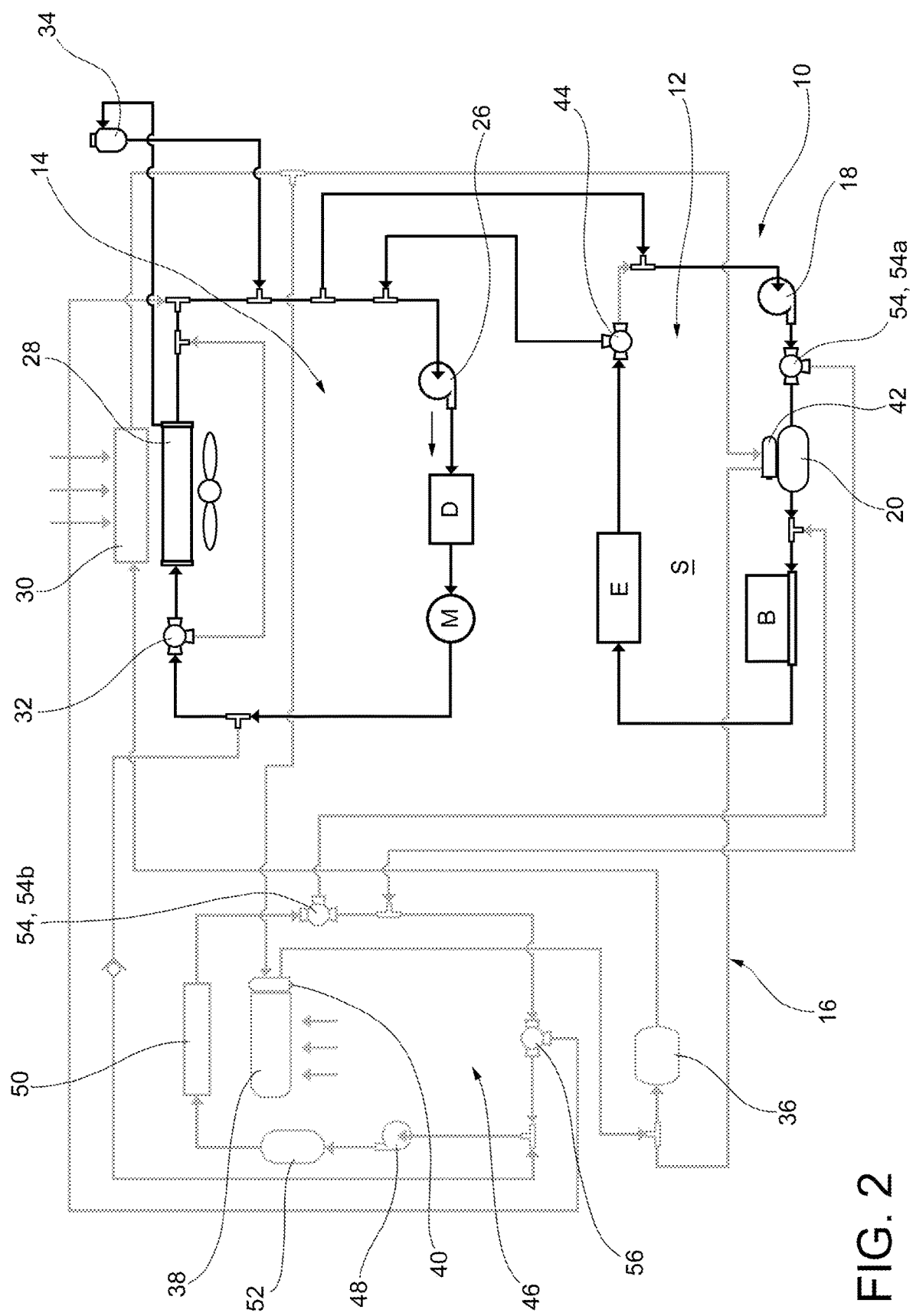
FIG. 2 is a schematic view of a first operating mode of the thermal control system of FIG. 1, wherein the loop branches in which the heat transfer fluid or refrigerant circulates are highlighted.

A first operating mode, called "passive cooling mode of the battery pack," is shown in FIG. 2. In this operating mode, the first valve assembly 44 is configured in the second mode, whereby the battery thermal control loop 12 and the powertrain thermal control loop 14 are coupled in a partial bleed-off configuration in which only a portion of the flow rate of heat transfer fluid circulating within the powertrain thermal control loop 14 also circulates in the battery thermal control loop 12. At the same time, the bypass valve 32 of the powertrain thermal control loop 14 is configured in the first mode, so as to allow the passage of the heat transfer fluid circulating within the powertrain thermal control loop 14 in the radiator 28. At the same time, the second valve assembly 54 is configured in the first mode so that the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. At the same time, the third valve assembly 56 is configured in the first mode so that the powertrain thermal control loop 14 and the cabin thermal control loop 46 operate in parallel and independently of each other, i.e. the heat transfer fluid circulating within the cabin thermal control loop 46 does not also circulate within the powertrain thermal control loop 14, i.e. there is no sharing of flow rate of heat transfer fluid between the powertrain thermal control loop 14 and the cabin thermal control loop 46. At the same time, the electric heating device 52 of the cabin thermal control loop 46 is deactivated, i.e. it is off and does not supply heat to the fluid circulating within the cabin thermal control loop 46. At the same time, the compressor 36 of the refrigerant loop 16 is deactivated, that is, it is off. In this mode, the battery pack B and the electric motor M are cooled by the radiator 28, while the compressor 36 is not used and the electricity consumption is reduced. This operating mode is particularly useful when it is necessary to reduce electricity consumption, for example to increase the vehicle's kilometer range. This operating mode may be used when the ambient temperature is low or medium, for example it is between about 10° C. and 30° C., and when the demand for electric power by the electric motor M is low or medium; a typical use is, therefore, that of urban cycles, of the WLTP cycle type (World harmonized Light-duty vehicles Test Procedure) currently used.

Figure 3:
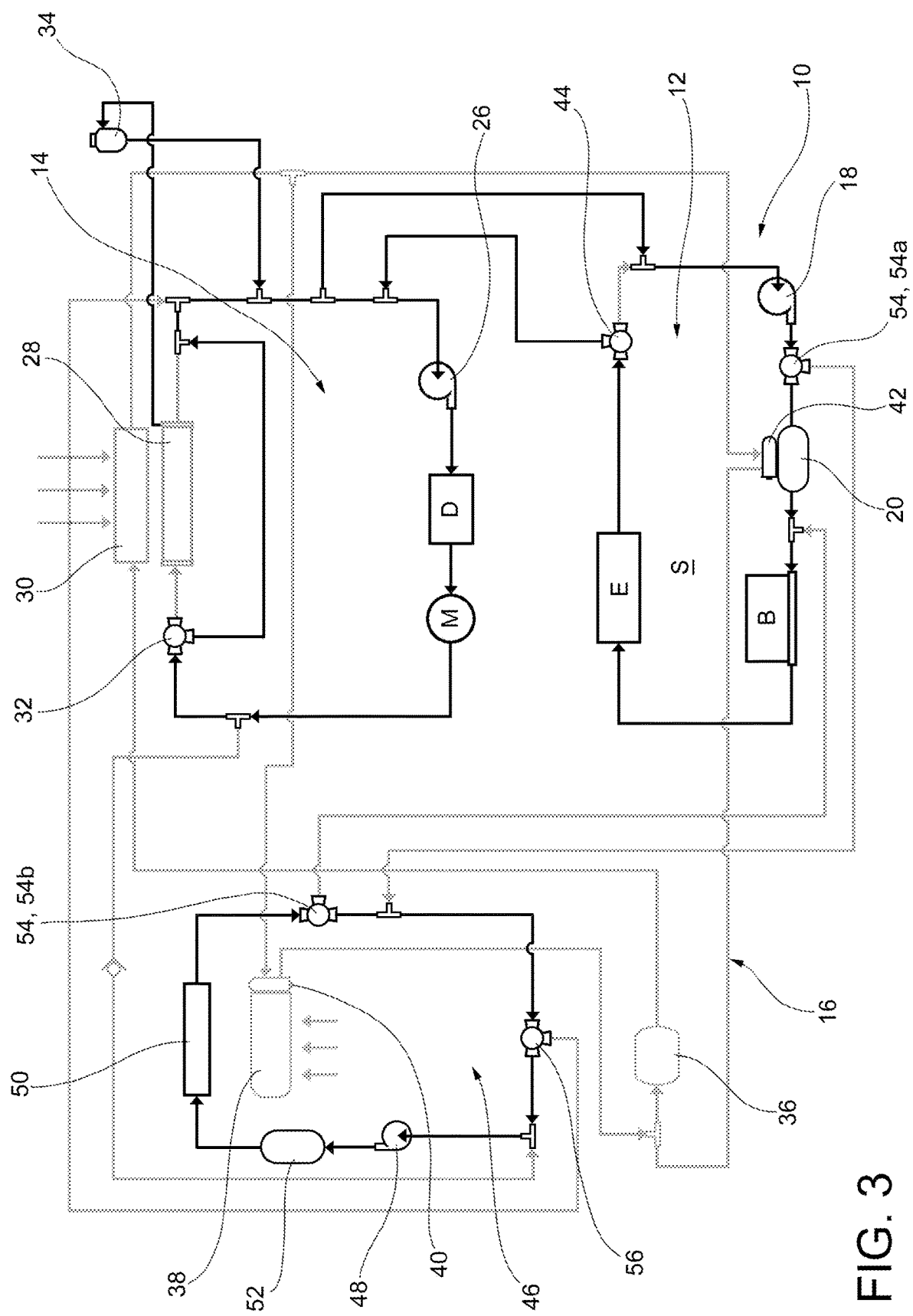
FIG. 3 is a schematic view of a second operating mode of the thermal control system of FIG. 1, wherein the loop branches in which the heat transfer fluid or refrigerant circulates are highlighted.

A second operating mode, called "passive heating mode of the battery pack," is shown in FIG. 3. In this operating mode, the first valve assembly 44 is configured in the second mode, whereby the battery thermal control loop 12 and the powertrain thermal control loop 14 are coupled in a partial bleed-off configuration in which only a portion of the flow rate of heat transfer fluid circulating within the powertrain thermal control loop 14 also circulates in the battery thermal control loop 12. At the same time, the bypass valve 32 of the powertrain thermal control loop 14 is configured in the second mode, so as to allow the heat transfer fluid circulating within the powertrain thermal control loop 14 to bypass said radiator 28, and be diverted onto a branch which bypasses the radiator 28. At the same time, the second valve assembly 54 is configured in the first mode so that the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. At the same time, the third valve assembly 56 is configured in the first mode so that the powertrain thermal control loop 14 and the cabin thermal control loop 46 operate in parallel and independently of each other, i.e. the heat transfer fluid circulating within the cabin thermal control loop 46 does not also circulate within the powertrain thermal control loop 14, i.e. there is no sharing of flow rate of heat transfer fluid between the powertrain thermal control loop 14 and the cabin thermal control loop 46. At the same time, the electric heating device 52 of the cabin thermal control loop 46 is activated, i.e. it is on and supplies heat to the fluid circulating within the cabin thermal control loop 46. At the same time, the compressor 36 of the refrigerant loop 16 is deactivated, that is, it is off. In this mode, the battery pack B is heated by the excess heat of the electric motor M, while the compressor 36 is not used and electricity consumption is reduced. This operating mode is particularly useful when it is necessary to reduce electricity consumption, for example to increase the vehicle's kilometer range. This operating mode may be used when the ambient temperature is low, for example it is between about 0° C. and 10° C., and when the demand for electric power by the electric motor M is medium or high; a typical use is, therefore, that of urban cycles, of the WLTP cycle type (World harmonized Light-duty vehicles Test Procedure) currently used. When the thermal control system 10 operates in this operating mode, the battery pack B is always kept close to the optimum temperature conditions for operation, such as, for example, and in a non-limiting manner, within a temperature range including between about 25° C. and about 30° C., and depending on the type of cells in the battery pack B.

Figure 4:
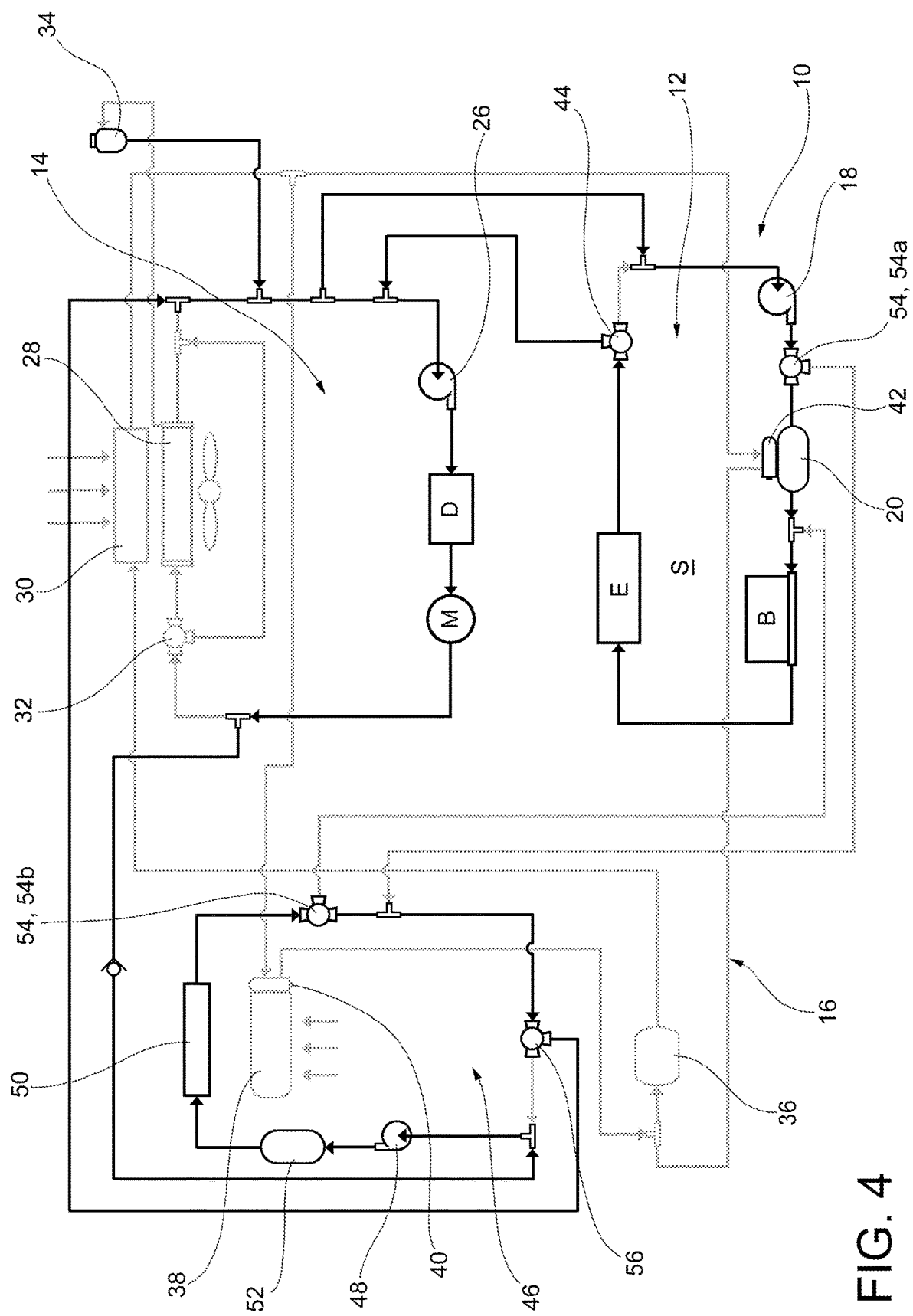
FIG. 4 is a schematic view of a third operating mode of the thermal control system of FIG. 1, wherein the loop branches in which the heat transfer fluid or refrigerant circulates are highlighted.

A third operating mode, called "passive heating mode of the battery pack B and of the cabin," is shown in FIG. 4. In this operating mode, the first valve assembly 44 is configured in the second mode, whereby the battery thermal control loop 12 and the powertrain thermal control loop 14 are coupled in a partial bleed-off configuration in which only a portion of the flow rate of heat transfer fluid circulating within the powertrain thermal control loop 14 also circulates in the battery thermal control loop 12. At the same time, the bypass valve 32 of the powertrain thermal control loop 14 is configured in the second mode, so as to allow the heat transfer fluid circulating within the powertrain thermal control loop 14 to bypass said radiator 28, and be diverted onto a branch which bypasses the radiator 28. At the same time, the second valve assembly 54 is configured in the first mode so that the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. At the same time, the third valve assembly 56 is configured in the second mode so that the powertrain thermal control loop 14 and the cabin thermal control loop 46 are coupled in a series configuration in which the entire flow rate of heat transfer fluid circulating within the powertrain thermal control loop 14 also circulates in the cabin thermal control loop 46. At the same time, the electric heating device 52 of the cabin thermal control loop 46 is deactivated, i.e. it is off and does not supply heat to the fluid circulating within the cabin thermal control loop 46. At the same time, the compressor 36 of the refrigerant loop 16 is deactivated, that is, it is off. In this mode, the battery pack B and the cabin of the vehicle are heated, or kept at ambient temperature, by the excess heat of the electric motor M, while the compressor 36 is not used and the electricity consumption is reduced. This operating mode is particularly useful when it is necessary to reduce electricity consumption, for example to increase the vehicle's kilometer range. This operating mode may be used when the ambient temperature is low or medium, for example between about −10° C. and about 20° C., and the demand for electric power by the electric motor M is medium or high; a typical use is therefore that of the FTP20 cycle, according to the EPA regulatory standard currently in force in the United States, and of the WLTP (World harmonized Light-duty vehicles Test Procedure) and RDE cycle, according to the regulatory standard currently in force.

Figure 5:
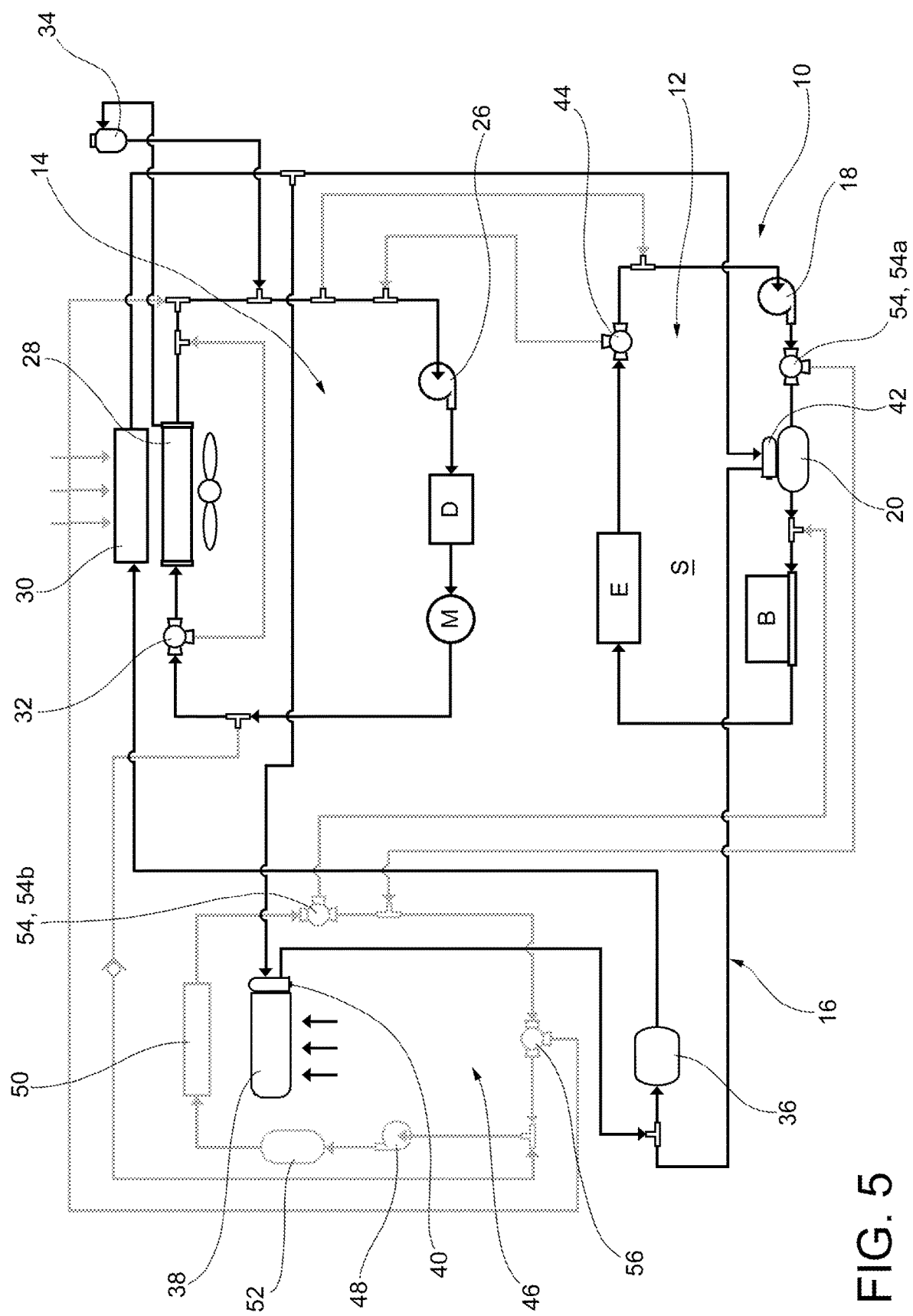
FIG. 5 is a schematic view of a fourth operating mode of the thermal control system of FIG. 1, wherein the loop branches in which the heat transfer fluid or refrigerant circulates are highlighted.

A fourth operating mode, referred to as the "maximum performance active cooling mode," is shown in FIG. 5. In this operating mode, the first valve assembly 44 is configured in the first mode, whereby the battery thermal control loop 12 and the powertrain thermal control loop 14 operate in parallel and independently of each other, i.e. the heat transfer fluid circulating within the powertrain thermal control loop 14 does not also circulate within the battery thermal control loop 12, i.e. there is no sharing of flow rate of heat transfer fluid between the battery thermal control loop 12 and the powertrain thermal control loop 14. At the same time, the bypass valve 32 of the powertrain thermal control loop 14 is configured in the first mode, so as to allow the passage of the heat transfer fluid circulating within the powertrain thermal control loop 14 in the radiator 28. At the same time, the second valve assembly 54 is configured in the first mode so that the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. At the same time, the third valve assembly 56 is configured in the first mode so that the powertrain thermal control loop 14 and the cabin thermal control loop 46 operate in parallel and independently of each other, i.e. the heat transfer fluid circulating within the cabin thermal control loop 46 does not also circulate within the powertrain thermal control loop 14, i.e. there is no sharing of flow rate of heat transfer fluid between the powertrain thermal control loop 14 and the cabin thermal control loop 46. At the same time, the electric heating device 52 of the cabin thermal control loop 46 is deactivated, i.e. it is off and does not supply heat to the fluid circulating within the cabin thermal control loop 46. At the same time, the compressor 36 of the refrigerant loop 16 is activated, that is, it is on. Finally, at the same time, the second thermal expansion valve 42 is configured in such a way as to allow the heat exchange between the heat transfer fluid circulating within the battery thermal control loop 12 and the refrigerant circulating within the refrigerant loop 16 through the refrigerant-fluid heat exchanger 20. In this mode, the battery thermal control loop 12, the powertrain thermal control loop 14 and the cabin thermal control loop 46 are decoupled from each other. The battery pack B is cooled by means of the heat transfer guaranteed by the refrigerant-fluid heat exchanger 20, while the electric motor M is cooled by the radiator 28, which is in turn cooled by the external air (shown with three small parallel arrows in the figures). This operating mode is particularly useful, for example, when the electric vehicle is in fast charging mode, whereby the battery pack B is subjected to a significant thermal load, or when the power demand to the electric motor M is high or very high, as in the case of a race or competition, or, again, when the ambient temperature is high, for example it is higher than about 30° C.

Figure 6:
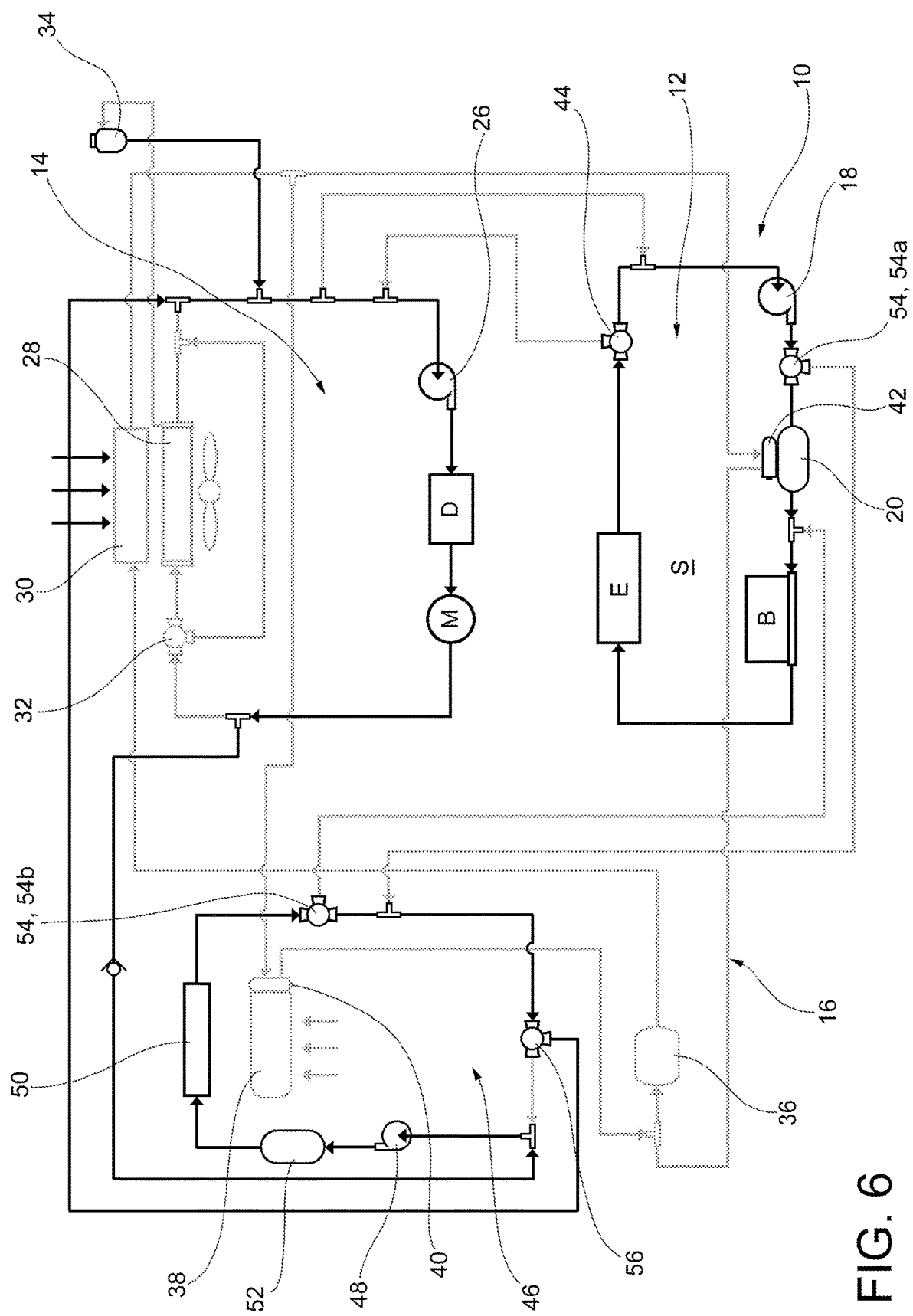
FIG. 6 is a schematic view of a fifth operating mode of the thermal control system of FIG. 1, wherein the loop branches in which the heat transfer fluid or refrigerant circulates are highlighted.

A fifth operating mode, called "passive heating mode of the cabin," is shown in FIG. 6. In this operating mode, the first valve assembly 44 is configured in the first mode, whereby the battery thermal control loop 12 and the powertrain thermal control loop 14 operate in parallel and independently of each other, i.e. the heat transfer fluid circulating within the powertrain thermal control loop 14 does not also circulate within the battery thermal control loop 12, i.e. there is no sharing of flow rate of heat transfer fluid between the battery thermal control loop 12 and the powertrain thermal control loop 14. At the same time, the bypass valve 32 of the powertrain thermal control loop 14 is configured in the second mode, so as to allow the heat transfer fluid circulating within the powertrain thermal control loop 14 to bypass said radiator 28, and be diverted onto a branch which bypasses the radiator 28. At the same time, the second valve assembly 54 is configured in the first mode so that the battery thermal control loop 12 and the cabin thermal control loop 46 operate in parallel and independently of each other, i.e. the heat transfer fluid circulating within the cabin thermal control loop 46 does not also circulate within the battery thermal control loop 12, i.e. there is no sharing of flow rate of heat transfer fluid between the battery thermal control loop 12 and the cabin thermal control loop 46. At the same time, the third valve assembly 56 is configured in the second mode so that the powertrain thermal control loop 14 and the cabin thermal control loop 46 are coupled in a series configuration in which the entire flow rate of heat transfer fluid circulating within the powertrain thermal control loop 14 also circulates in the cabin thermal control loop 46. At the same time, the electric heating device 52 of the cabin thermal control loop 46 is activated, i.e. it is on and supplies heat to the fluid circulating within the cabin thermal control loop 46. At the same time, the compressor 36 of the refrigerant loop 16 is deactivated, that is, it is off. In this mode, the cabin of the vehicle is heated, or kept at ambient temperature, also by means of the excess heat of the electric motor M, thus minimizing, with the same comfort in the cabin, the use of the electric heating device 52, while the compressor 36 is not used and electricity consumption is reduced. This operating mode is particularly useful when it is necessary to reduce electricity consumption, for example to increase the vehicle's kilometer range. This operating mode may be used when the ambient temperature is low or medium, for example it is between about −10° C. and about 20° C., and the demand for electric power by the electric motor M is medium or high; a typical use is therefore that of the FTP20 cycle, according to the EPA regulatory standard currently in force in the United States, and of the WLTP (World harmonized Light-duty vehicles Test Procedure) and RDE cycle according to the regulatory standard currently in force. When the thermal control system 10 operates in this operating mode, the battery pack B is always kept close to the optimum temperature conditions for operation, such as, for example, and in a non-limiting manner, within a temperature range including between about 25° C. and about 30° C., and depending on the type of cells in the battery pack B.

Figure 7:
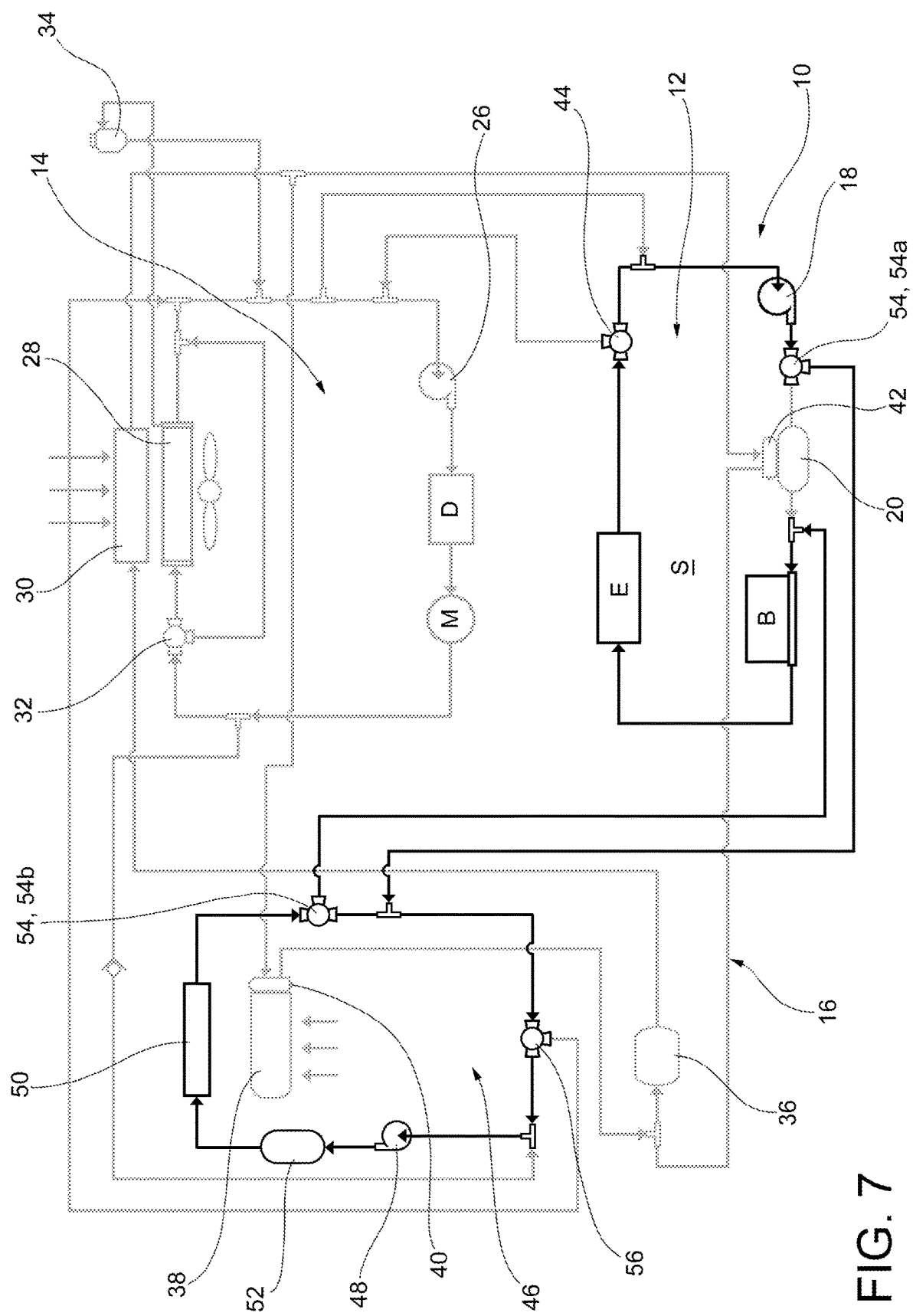
FIG. 7 is a schematic view of a sixth operating mode of the thermal control system of FIG. 1, wherein the loop branches in which the heat transfer fluid or refrigerant circulates are highlighted.
Figure 8:
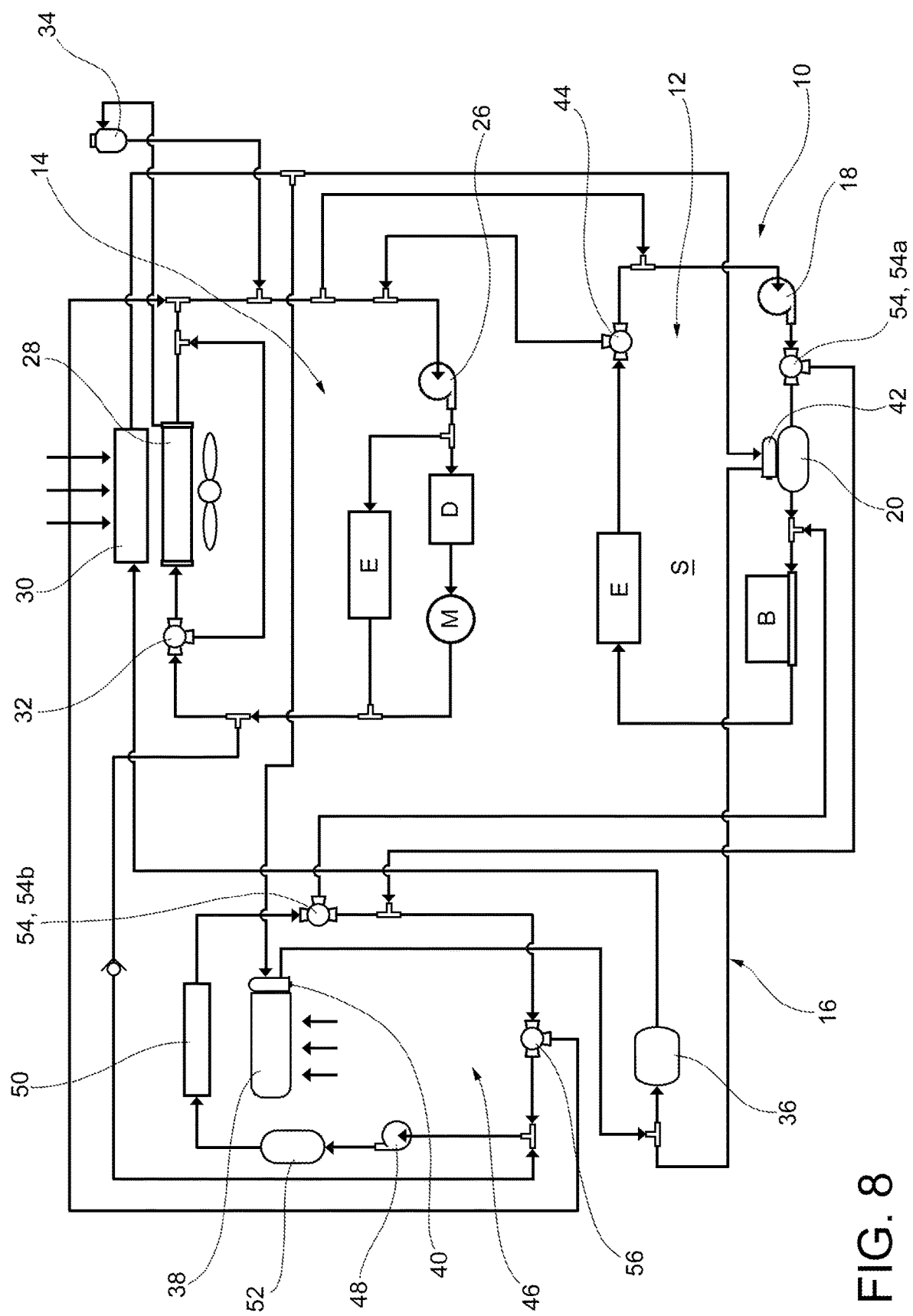
FIG. 8 is a schematic view of the thermal control system according to a further embodiment of the invention.
Figure 9:
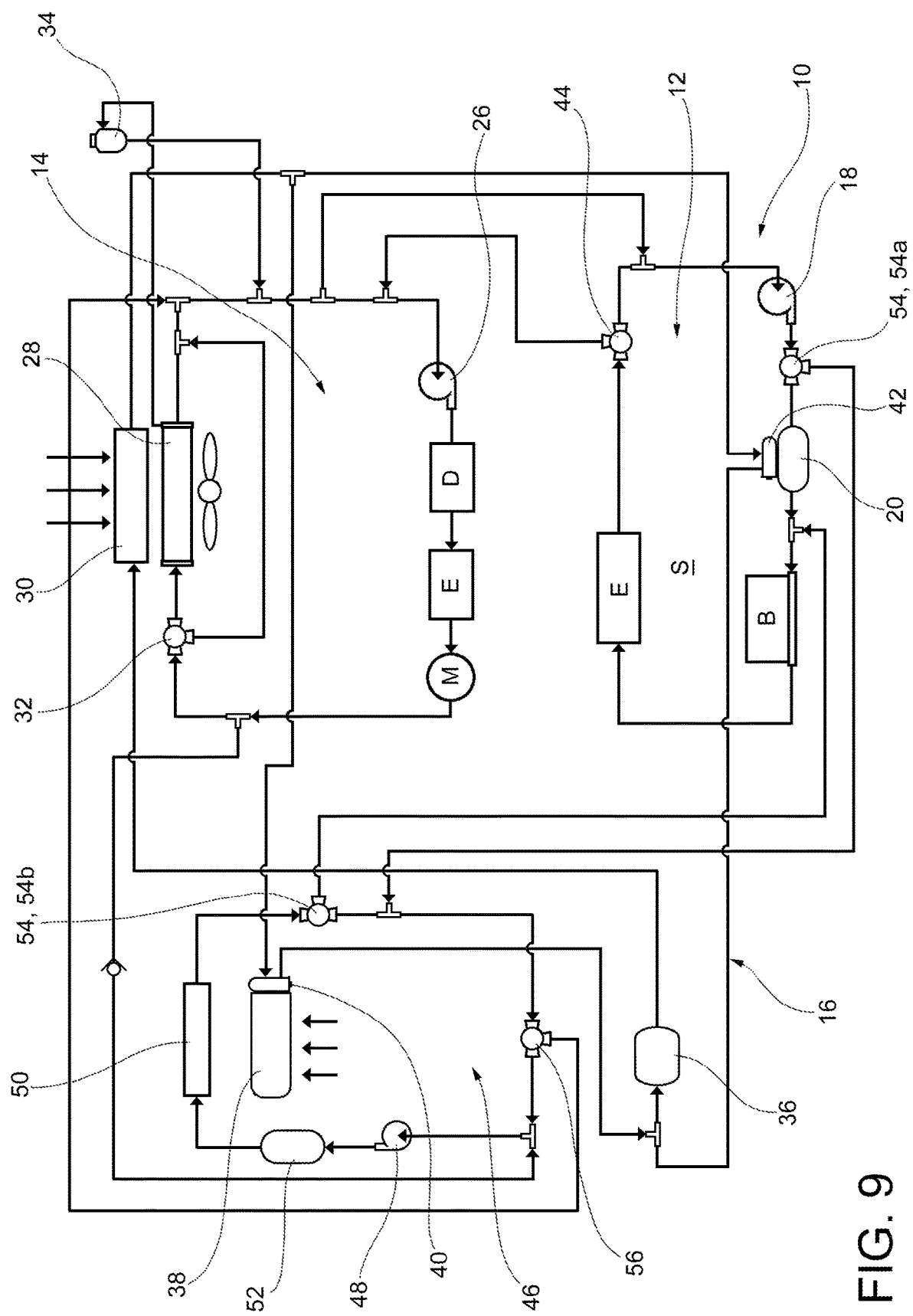
FIG. 9 is a schematic view of the thermal control system according to a further embodiment of the invention.
Figure 10:
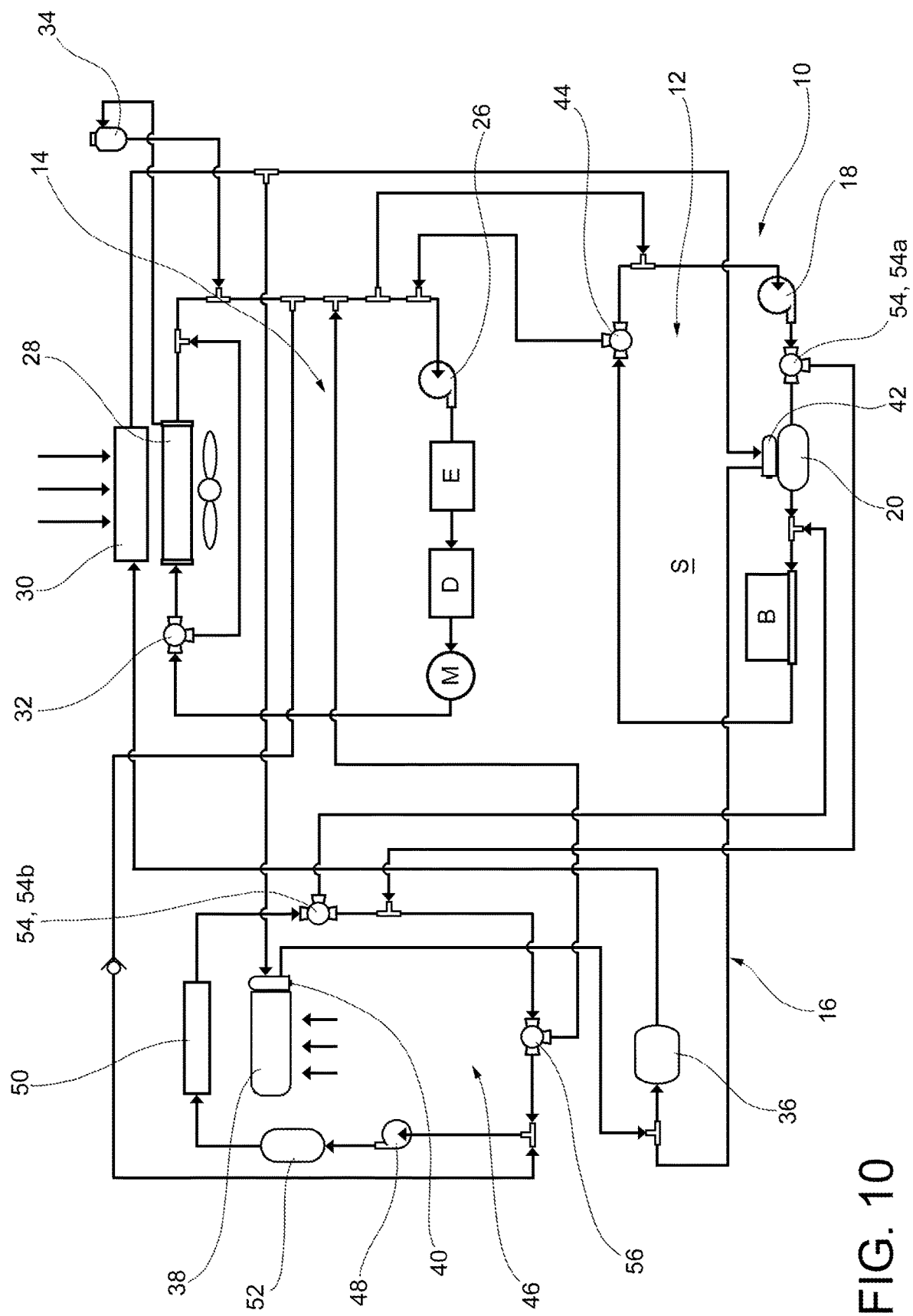
FIG. 10 is a schematic view of the thermal control system according to a further embodiment of the invention.
Figure 11:
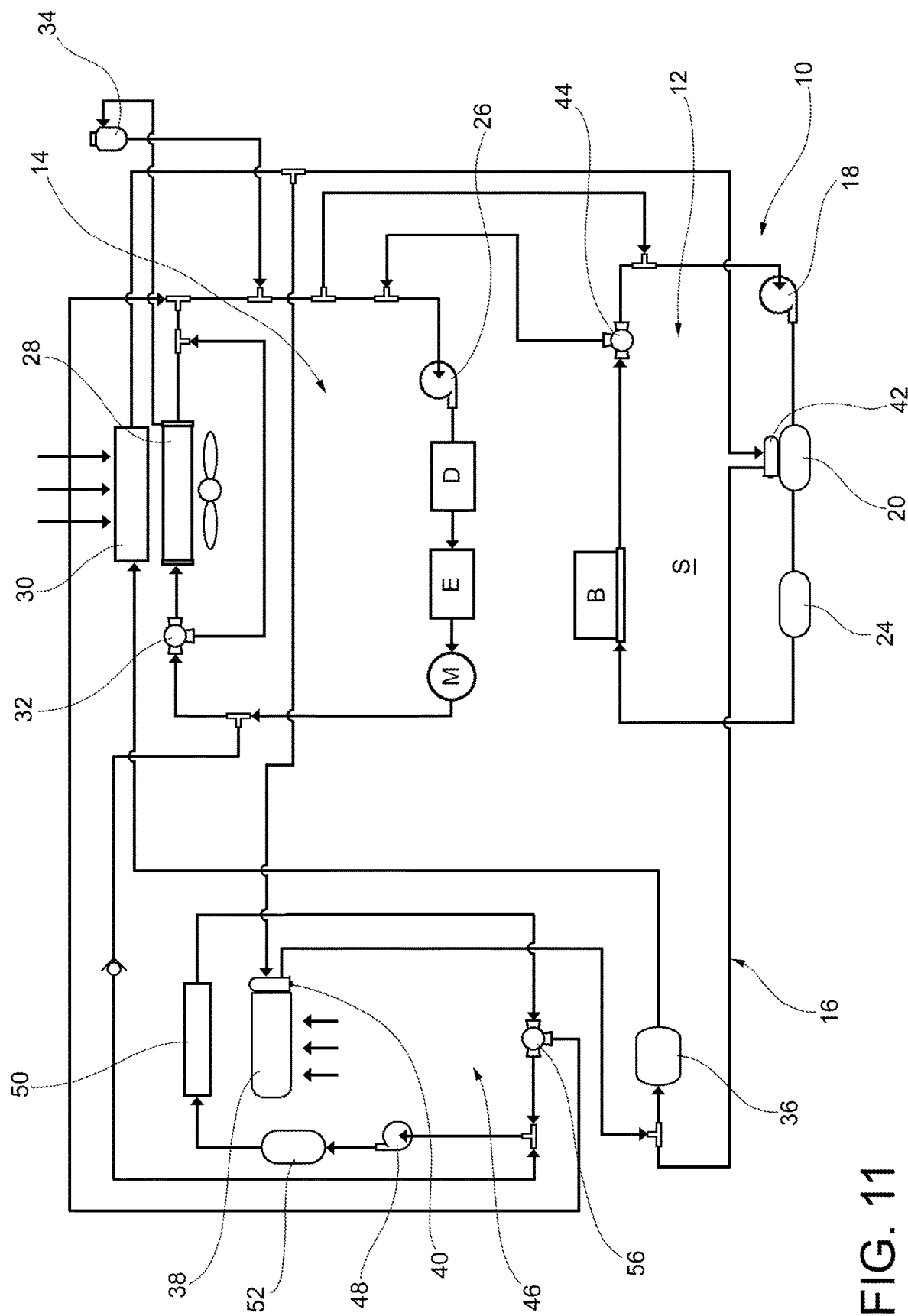
FIG. 11 is a schematic view of the thermal control system according to a further embodiment of the invention.
Figure 12:
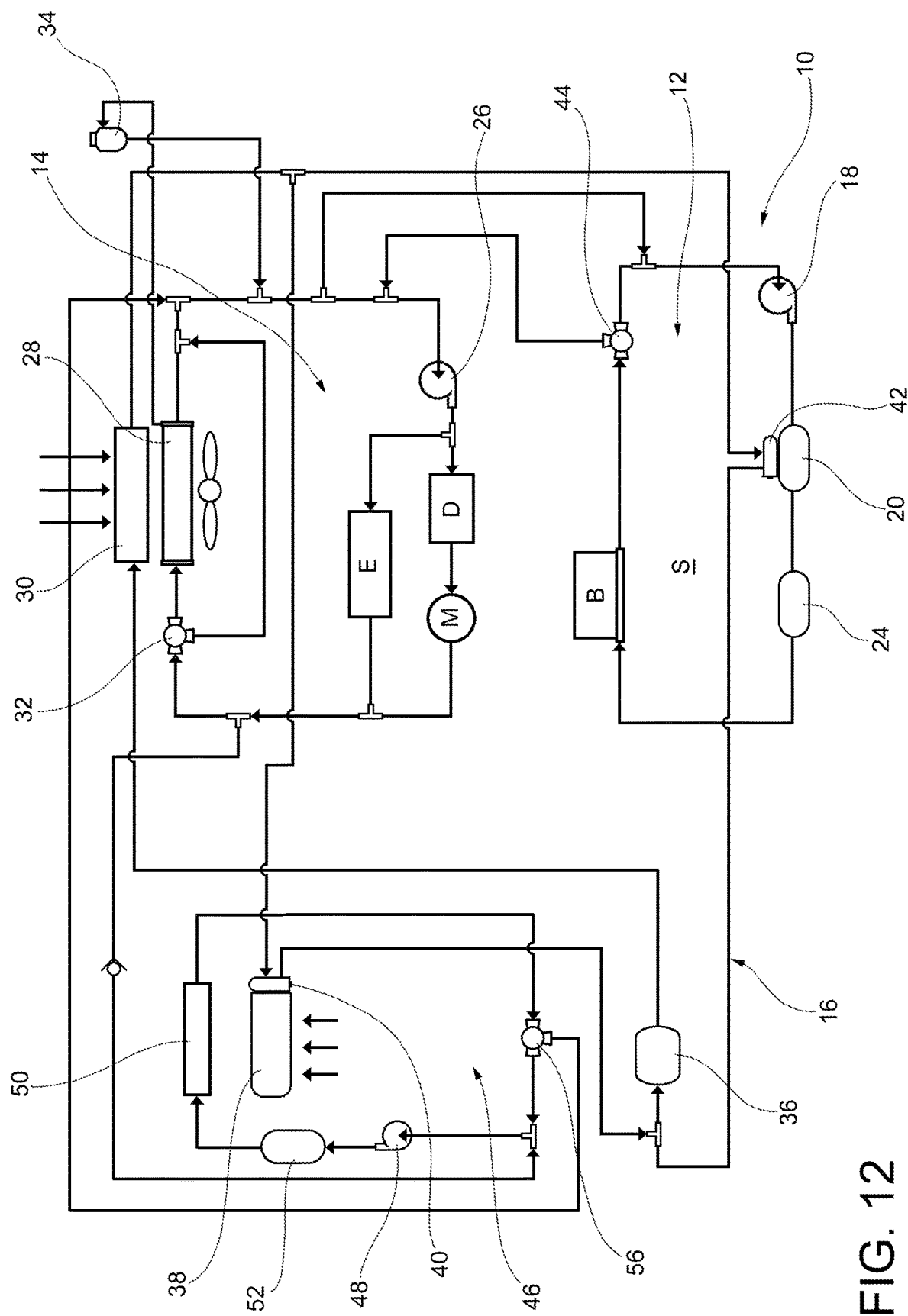
FIG. 12 is a schematic view of the thermal control system according to a further embodiment of the invention.

A sixth operating mode, called "active battery heating mode," is shown in FIG. 7. In this operating mode, the first valve assembly 44 is configured in the first mode, whereby the battery thermal control loop 12 and the powertrain thermal control loop 14 operate in parallel and independently of each other, i.e. the heat transfer fluid circulating within the powertrain thermal control loop 14 does not also circulate within the battery thermal control loop 12, i.e. there is no sharing of flow rate of heat transfer fluid between the battery thermal control loop 12 and the powertrain thermal control loop 14. At the same time, the bypass valve 32 of the powertrain thermal control loop 14 is configured in the second mode, so as to allow the heat transfer fluid circulating within the powertrain thermal control loop 14 to bypass said radiator 28, and be diverted onto a branch which bypasses the radiator 28. At the same time, the second valve assembly 54 is configured in the second mode so that the battery thermal control loop 12 and the cabin thermal control loop 46 are coupled in a series configuration in which the entire flow rate of heat transfer fluid circulating within the battery thermal control loop 12 also circulates in the cabin thermal control loop 46. At the same time, the third valve assembly 56 is configured in the first mode so that the powertrain thermal control loop 14 and the cabin thermal control loop 46 operate in parallel and independently of each other, i.e. the heat transfer fluid circulating within the cabin thermal control loop 46 does not also circulate within the powertrain thermal control loop 14, i.e. there is no sharing of flow rate of heat transfer fluid between the powertrain thermal control loop 14 and the cabin thermal control loop 46. At the same time, the electric heating device 52 of the cabin thermal control loop 46 is activated, i.e. it is on and supplies heat to the fluid circulating within the cabin thermal control loop 46. At the same time, the compressor 36 of the refrigerant loop 16 is deactivated, that is, it is off. In this mode, the battery pack B of the vehicle is heated by the heat supplied by the electric heating device 52, so as to heat up the battery pack B as quickly as possible. This operating mode is particularly useful when it is necessary to keep the temperature of the battery pack B above a minimum temperature, for example when the ambient temperature is low or very low, for example it is below about 0° C., and the electric motor M is switched off.

Clearly, as is evident to those skilled in the art, the control methods for controlling a thermal control system 10 according to the invention are many and, even if not all of them have been explicitly described, these are easily deducible by those skilled in the art, starting from the description of the thermal control system 10 and from the thermal control methods described by way of example in a non-limiting manner.

Clearly, also the application of the thermal control system 10 according to the invention to a vehicle comprising a powertrain D with at least one electric motor M and a supply system S with a battery pack B adapted to power said powertrain D forms part of the invention.

As is apparent to those skilled in the art, the invention has several advantages with respect to the prior art.

In particular, by virtue of the configuration of the first valve assembly, it is possible to establish different connecting modes between the battery thermal control loop and the powertrain thermal control loop, and, consequently, of the overall operation of the thermal control system.

In particular, unlike the prior art, by virtue of the use of proportional mechanical valves, the multi-mode thermal control does not only work in the modes previously described in an exemplary and non-limiting manner, but also in a series of intermediate modes, which may be managed by thermal sensors arranged in the loop and on the individual components in order to ensure maximum energy efficiency and the correct functioning of the systems in relation to their functional specifications.

Of course, the principle of the invention being understood, the manufacturing details and the embodiments may widely vary compared to what described and illustrated by way of non-limiting example only, without departing from the scope of the invention as defined in the accompanying claims.

What is claimed is:

1. A multi-mode thermal control system for a vehicle having a powertrain with an electric motor and a supply system with a battery pack adapted to power said electric motor, the multi-mode thermal control system comprising:
- a battery thermal control loop comprising a first circulation pump and a refrigerant-fluid heat exchanger, wherein said first circulation pump is adapted to circulate a heat transfer fluid within said battery thermal control loop, and wherein said battery thermal control loop is thermally coupled to said battery pack of the vehicle;
- a powertrain thermal control loop comprising a second circulation pump, wherein said second circulation pump is adapted to circulate the heat transfer fluid within said powertrain thermal control loop, and wherein said powertrain thermal control loop is thermally coupled to said electric motor of the vehicle;
- a first connecting branch adapted to allow passage of the heat transfer fluid from the powertrain thermal control loop to the battery thermal control loop;
- a second connecting branch adapted to allow passage of the heat transfer fluid from the battery thermal control loop to the powertrain thermal control loop;
- a refrigerant loop in which a refrigerant is circulated, the refrigerant loop comprising a compressor, a condenser, an evaporator, a first thermal expansion valve adapted to couple said evaporator to said refrigerant loop, and a second thermal expansion valve adapted to couple said refrigerant-fluid heat exchanger to said refrigerant loop;
- a first valve assembly, said first valve assembly comprising a three-way valve, and being adapted to control a fluidic connection between the battery thermal control loop and the powertrain thermal control loop by adjusting passage of the heat transfer fluid in the first connecting branch or in the second connecting branch, and being configurable for this purpose in a first mode and in a second mode,
- wherein, when the first valve assembly is configured in the first mode, the battery thermal control loop and the powertrain thermal control loop are not in fluidic connection with each other, such that the heat transfer fluid circulating within the battery thermal control loop does not also circulate in the powertrain thermal control loop, and
- when the first valve assembly is configured in the second mode, the battery thermal control loop and the powertrain thermal control loop are coupled in a partial bleed-off configuration in which only a portion of a flow rate of the heat transfer fluid circulating within said powertrain thermal control loop also circulates in the battery thermal control loop;
- a cabin thermal control loop, which comprises a third circulation pump and a liquid-air heat exchanger, wherein said third circulation pump is adapted to circulate the heat transfer fluid within said cabin thermal control loop and through said liquid-air heat exchanger, and wherein said cabin thermal control loop provides temperature control of a vehicle passenger cabin;
- a third connecting branch adapted to allow passage of the heat transfer fluid from the battery thermal control loop to the cabin thermal control loop;
- a fourth connecting branch adapted to allow passage of the heat transfer fluid from the cabin thermal control loop to the battery thermal control loop;
- a fifth connecting branch adapted to allow passage of the heat transfer fluid from the cabin thermal control loop to the powertrain thermal control loop; and
- a sixth connecting branch adapted to allow passage of the heat transfer fluid from the powertrain thermal control loop to the cabin thermal control loop.

2. The multi-mode thermal control system of claim 1, wherein said first valve assembly consists of a three-way valve.

3. The multi-mode thermal control system of claim 1, further comprising a second valve assembly adapted to control a fluidic connection between the battery thermal control loop and the cabin thermal control loop by adjusting passage of the heat transfer fluid in the third connecting branch or in the fourth connecting branch, and configurable, for this purpose, in a first mode and in a second mode, wherein,
- when the second valve assembly is configured in the first mode, the battery thermal control loop and the cabin thermal control loop are not in fluidic connection with each other, such that the heat transfer fluid circulating within the battery thermal control loop does not also circulate in the cabin thermal control loop, and wherein
- when the second valve assembly is configured in the second mode, the battery thermal control loop and the cabin thermal control loop are coupled in a series configuration in which an entire flow rate of the heat transfer fluid circulating within said battery thermal control loop also circulates in the cabin thermal control loop.

4. The multi-mode thermal control system of claim 3, further comprising a third valve assembly adapted to control a fluidic connection between the powertrain thermal control loop and the cabin thermal control loop by adjusting passage of the heat transfer fluid in the fifth connecting branch or in the sixth connecting branch, and configurable, for this purpose, in a first mode and in a second mode, wherein,
- when the third valve assembly is configured in the first mode, the cabin thermal control loop and the powertrain thermal control loop are not in fluidic connection with each other, such that the heat transfer fluid circulating within the powertrain thermal control loop does not also circulate within the cabin thermal control loop, and wherein
- when the third valve assembly is configured in the second mode, the cabin thermal control loop and the powertrain thermal control loop are coupled in a series configuration in which the entire flow rate of the heat transfer fluid circulating within said cabin thermal control loop also circulates in the powertrain thermal control loop.

5. The multi-mode thermal control system of claim 1, wherein the powertrain thermal control loop comprises a radiator thermally coupled to said condenser of the refrigerant loop.

6. The multi-mode thermal control system of claim 5, wherein the powertrain thermal control loop further comprises a bypass valve configurable in a first mode and in a second mode, wherein when the bypass valve is configured in the first mode, the bypass valve allows the heat transfer fluid circulating within said powertrain thermal control loop to flow through said radiator, and wherein when the bypass valve is configured in the second mode, the bypass valve allows the heat transfer fluid circulating within said powertrain thermal control loop to bypass said radiator.

7. The multi-mode thermal control system of claim 1, wherein the cabin thermal control loop further comprises an electric heating device adapted to provide heat to the heat transfer fluid circulating within the cabin thermal control loop when turned on.

8. A control method for controlling a multi-mode thermal control system, comprising:
- a) providing a multi-mode thermal control system for a vehicle having a powertrain with an electric motor and a supply system with a battery pack adapted to power said electric motor,
  the multi-mode thermal control system comprising:
    - a battery thermal control loop, comprising a first circulation pump and a refrigerant-fluid heat exchanger, wherein said first circulation pump is adapted to circulate a heat transfer fluid within said battery thermal control loop, and wherein said battery thermal control loop is thermally coupled to said battery pack of the vehicle;
    - a powertrain thermal control loop comprising a second circulation pump, wherein said second circulation pump is adapted to circulate the heat transfer fluid within said powertrain thermal control loop, and wherein said powertrain thermal control loop is thermally coupled to said electric motor of the vehicle;
    - a first connecting branch adapted to allow passage of the heat transfer fluid from the powertrain thermal control loop to the battery thermal control loop;
    - a second connecting branch adapted to allow passage of the heat transfer fluid from the battery thermal control loop to the powertrain thermal control loop;
    - a refrigerant loop in which a refrigerant is circulated, the refrigerant loop comprising a compressor, a condenser, an evaporator, a first thermal expansion valve adapted to couple said evaporator to said refrigerant loop, and a second thermal expansion valve adapted to couple said refrigerant-fluid heat exchanger to said refrigerant loop; and
    - a first valve assembly, said first valve assembly comprising a three-way valve, and being adapted to control a fluidic connection between the battery thermal control loop and the powertrain thermal control loop by adjusting passage of the heat transfer fluid in the first connecting branch or in the second connecting branch, and being configurable for this purpose in a first mode and in a second mode,
      wherein, when the first valve assembly is configured in the first mode, the battery thermal control loop and the powertrain thermal control loop are not in fluidic connection with each other, such that the heat transfer fluid circulating within the battery thermal control loop does not also circulate in the powertrain thermal control loop, and
      when the first valve assembly is configured in the second mode, the battery thermal control loop and the powertrain thermal control loop are coupled in a partial bleed-off configuration in which only a portion of a flow rate of the heat transfer fluid circulating within said powertrain thermal control loop also circulates in the battery thermal control loop;
    - a cabin thermal control loop, which comprises a third circulation pump and a liquid-air heat exchanger, wherein said third circulation pump is adapted to circulate the heat transfer fluid within said cabin thermal control loop and through said liquid-air heat exchanger, and wherein said cabin thermal control loop provides temperature control of a vehicle passenger cabin;
    - a third connecting branch adapted to allow passage of the heat transfer fluid from the battery thermal control loop to the cabin thermal control loop;
    - a fourth connecting branch adapted to allow passage of the heat transfer fluid from the cabin thermal control loop to the battery thermal control loop;
    - a fifth connecting branch adapted to allow passage of the heat transfer fluid from the cabin thermal control loop to the powertrain thermal control loop;
    - a sixth connecting branch adapted to allow passage of the heat transfer fluid from the powertrain thermal control loop to the cabin thermal control loop,
      wherein the multi-mode thermal control system further comprises a second valve assembly adapted to control a fluidic connection between the battery thermal control loop and the cabin thermal control loop by adjusting passage of the heat transfer fluid in the third connecting branch or in the fourth connecting branch, and configurable, for this purpose, in a first mode and in a second mode, wherein,
      when the second valve assembly is configured in the first mode, the battery thermal control loop and the cabin thermal control loop are not in fluidic connection with each other, such that the heat transfer fluid circulating within the battery thermal control loop does not also circulate in the cabin thermal control loop, and wherein
      when the second valve assembly is configured in the second mode, the battery thermal control loop and the cabin thermal control loop are coupled in a series configuration in which an entire flow rate of the heat transfer fluid circulating within said battery thermal control loop also circulates in the cabin thermal control loop,
      and wherein the cabin thermal control loop further comprises an electric heating device adapted to provide heat to the heat transfer fluid circulating within the cabin thermal control loop when turned on;
- b) configuring the second valve assembly in the first mode, so that the battery thermal control loop and the cabin thermal control loop are not in fluidic connection with each other, such that the heat transfer fluid circulating within the battery thermal control loop does not also circulate in the cabin thermal control loop; and
- c) configuring the first valve assembly in the second mode, so that the battery thermal control loop and the powertrain thermal control loop are coupled in partial bleed-off configuration in which only a portion of the flow rate of heat transfer fluid circulating within said powertrain thermal control loop also circulates in the battery thermal control loop.

9. The control method of claim 8, wherein the powertrain thermal control loop comprises a radiator thermally coupled to said condenser of the refrigerant loop, wherein the powertrain thermal control loop further comprises a bypass valve configurable in a first mode and in a second mode, wherein when the bypass valve is configured in the first mode, the bypass valve allows the heat transfer fluid circulating within said powertrain thermal control loop to flow through said radiator, and wherein when the bypass valve is configured in the second mode, the bypass valve allows the heat transfer fluid circulating within said powertrain thermal control loop to bypass said radiator, the method further comprising:
 d) configuring the bypass valve of the powertrain thermal control loop in the first mode, and
 e) turning the electric heating device of the cabin thermal control loop on.

10. A control method for controlling a multi-mode thermal control system, comprising:
 a) providing a multi-mode thermal control system for a vehicle having a powertrain with an electric motor and a supply system with a battery pack adapted to power said electric motor,
  the multi-mode thermal control system comprising:
   a battery thermal control loop, comprising a first circulation pump and a refrigerant-fluid heat exchanger, wherein said first circulation pump is adapted to circulate a heat transfer fluid within said battery thermal control loop, and wherein said battery thermal control loop is thermally coupled to said battery pack of the vehicle;
   a powertrain thermal control loop comprising a second circulation pump, wherein said second circulation pump is adapted to circulate the heat transfer fluid within said powertrain thermal control loop, and wherein said powertrain thermal control loop is thermally coupled to said electric motor of the vehicle;
   a first connecting branch adapted to allow passage of the heat transfer fluid from the powertrain thermal control loop to the battery thermal control loop;
   a second connecting branch adapted to allow passage of the heat transfer fluid from the battery thermal control loop to the powertrain thermal control loop;
   a refrigerant loop in which a refrigerant is circulated, the refrigerant loop comprising a compressor, a condenser, an evaporator, a first thermal expansion valve adapted to couple said evaporator to said refrigerant loop, and a second thermal expansion valve adapted to couple said refrigerant-fluid heat exchanger to said refrigerant loop; and
   a first valve assembly, said first valve assembly comprising a three-way valve, and being adapted to control a fluidic connection between the battery thermal control loop and the powertrain thermal control loop by adjusting passage of the heat transfer fluid in the first connecting branch or in the second connecting branch, and being configurable for this purpose in a first mode and in a second mode,
    wherein, when the first valve assembly is configured in the first mode, the battery thermal control loop and the powertrain thermal control loop are not in fluidic connection with each other, such that the heat transfer fluid circulating within the battery thermal control loop does not also circulate in the powertrain thermal control loop, and
    when the first valve assembly is configured in the second mode, the battery thermal control loop and the powertrain thermal control loop are coupled in a partial bleed-off configuration in which only a portion of a flow rate of the heat transfer fluid circulating within said powertrain thermal control loop also circulates in the battery thermal control loop;
   a cabin thermal control loop, which comprises a third circulation pump and a liquid-air heat exchanger, wherein said third circulation pump is adapted to circulate the heat transfer fluid within said cabin thermal control loop and through said liquid-air heat exchanger, and wherein said cabin thermal control loop provides temperature control of a vehicle passenger cabin;
   a third connecting branch adapted to allow passage of the heat transfer fluid from the battery thermal control loop to the cabin thermal control loop;
   a fourth connecting branch adapted to allow passage of the heat transfer fluid from the cabin thermal control loop to the battery thermal control loop;
   a fifth connecting branch adapted to allow passage of the heat transfer fluid from the cabin thermal control loop to the powertrain thermal control loop;
   a sixth connecting branch adapted to allow passage of the heat transfer fluid from the powertrain thermal control loop to the cabin thermal control loop,
   wherein the multi-mode thermal control system further comprises a second valve assembly adapted to control a fluidic connection between the battery thermal control loop and the cabin thermal control loop by adjusting passage of the heat transfer fluid in the third connecting branch or in the fourth connecting branch, and configurable, for this purpose, in a first mode and in a second mode, wherein,
   when the second valve assembly is configured in the first mode, the battery thermal control loop and the cabin thermal control loop are not in fluidic connection with each other, such that the heat transfer fluid circulating within the battery thermal control loop does not also circulate in the cabin thermal control loop, and wherein
   when the second valve assembly is configured in the second mode, the battery thermal control loop and the cabin thermal control loop are coupled in a series configuration in which an entire flow rate of the heat transfer fluid circulating within said battery thermal control loop also circulates in the cabin thermal control loop,
   wherein the powertrain thermal control loop comprises a radiator thermally coupled to said condenser of the refrigerant loop, and
   wherein the powertrain thermal control loop further comprises a bypass valve configurable in a first mode and in a second mode, wherein when the bypass valve is configured in the first mode, the bypass valve allows the heat transfer fluid circulating within said powertrain thermal control loop to flow through said radiator, and wherein when the bypass valve is configured in the second mode, the bypass valve allows the heat transfer fluid circulating within said powertrain thermal control loop to bypass said radiator;
 f) configuring the second valve assembly in the first mode, so that the battery thermal control loop and the cabin thermal control loop are not in fluidic connection with each other, such that the heat transfer fluid circulating within the battery thermal control loop does not also circulate in the cabin thermal control loop; and
 g) configuring the first valve assembly in the first mode.

11. The control method of claim 10, further comprising:
 h) turning the compressor of the refrigerant loop on.

12. The control method of claim 10, wherein the cabin thermal control loop further comprises an electric heating device adapted to provide heat to the heat transfer fluid circulating within the cabin thermal control loop when turned on, the method further comprising:

e) turning the electric heating device of the cabin thermal control loop on.

\* \* \* \* \*